(12) United States Patent
Chung

(10) Patent No.: US 9,098,588 B2
(45) Date of Patent: Aug. 4, 2015

(54) INFORMATION PROCESSING APPARATUS, INFORMATION PROCESSING METHOD, AND INFORMATION PROCESSING PROGRAM

(71) Applicant: Rakuten, Inc., Shinagawa-ku, Tokyo (JP)

(72) Inventor: YoungJoo Chung, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/115,984

(22) PCT Filed: Jan. 16, 2013

(86) PCT No.: PCT/JP2013/050648
§ 371 (c)(1),
(2) Date: Nov. 6, 2013

(87) PCT Pub. No.: WO2014/002512
PCT Pub. Date: Jan. 3, 2014

(65) Prior Publication Data
US 2015/0032727 A1 Jan. 29, 2015

(30) Foreign Application Priority Data
Jun. 27, 2012 (JP) .................................. 2012-144797

(51) Int. Cl.
| | |
|---|---|
| *G06F 17/30* | (2006.01) |
| *G06Q 30/02* | (2012.01) |
| *G06Q 30/06* | (2012.01) |
| *G06F 15/16* | (2006.01) |

(52) U.S. Cl.
CPC ...... *G06F 17/30867* (2013.01); *G06F 17/3071* (2013.01); *G06F 17/30554* (2013.01); *G06F 17/30663* (2013.01); *G06Q 30/0251* (2013.01); *G06Q 30/0281* (2013.01); *G06Q 30/0282* (2013.01); *G06Q 30/0623* (2013.01)

(58) Field of Classification Search
None
See application file for complete search history.

(56) References Cited

U.S. PATENT DOCUMENTS

| | | | |
|---|---|---|---|
| 8,285,737 B1 * | 10/2012 | Lynn et al. ..................... | 707/765 |
| 2002/0026363 A1 | 2/2002 | Dunaway | |
| 2005/0080780 A1 * | 4/2005 | Colledge et al. .................. | 707/4 |
| 2005/0192869 A1 | 9/2005 | Maeda et al. | |
| 2010/0036694 A1 * | 2/2010 | Schroeder et al. ................ | 705/7 |
| 2014/0089321 A1 * | 3/2014 | Engel et al. ................... | 707/748 |

FOREIGN PATENT DOCUMENTS

| | | |
|---|---|---|
| JP | 2000-316492 A | 11/2000 |
| JP | 2002-175318 A | 6/2002 |
| JP | 2006-277410 A | 10/2006 |

* cited by examiner

Primary Examiner — Alex Gofman
(74) Attorney, Agent, or Firm — Sughrue Mion, PLLC

(57) ABSTRACT

Related ingredient names are extracted from ingredient names included in recipes while reducing the time and effort of a person. An information processing apparatus acquires one or more ingredient names included in each of one or more recipes included in one division of a plurality of divisions of recipes. Next, on the basis of an ordinal number of presentation of each of the acquired ingredient names in an ingredient list in the recipe, the information processing apparatus calculates a value indicating a probability that the ingredient name is a name of a main ingredient of the recipe belonging to the one division for each of the ingredient names. Then, the information processing apparatus associates a plurality of the ingredient names, among the acquired ingredient names, whose calculated values satisfy a predetermined condition with each other as related terms and stores the plurality of the ingredient names in a storage means.

16 Claims, 17 Drawing Sheets

FIG.2A

```
INGREDIENT                                    CLOSE THIS WINDOW

AMOUNT FOR [    ]  PERSON(S)

INGREDIENT NAME                         AMOUNT
110-1 →  [↕] [                              ]  [      ] ⊗
110-2 →  [↕] [                              ]  [      ] ⊗

[ADD]

[SAVE AND CLOSE]
                     |
                    120
```

FIG.2B

```
INGREDIENT                                    CLOSE THIS WINDOW

AMOUNT FOR [1]  PERSON(S)

INGREDIENT NAME                         AMOUNT
110-1 →  [↕] [BLACK TIGER SHRIMP             ]  [50 g    ] ⊗
110-2 →  [↕] [SPAGHETTI                      ]  [100 g   ] ⊗
110-3 →  [↕] [FRESH CREAM                    ]  [40 g    ] ⊗
110-4 →  [↕] [PEPPER                         ]  [A LITTLE] ⊗
110-5 →  [↕] [BROCCOLI                       ]  [1       ] ⊗
110-6 →  [↕] [PARSLEY                        ]  [MODERATE] ⊗

[ADD]

[SAVE AND CLOSE]
                     |
                    120
```

FIG.4

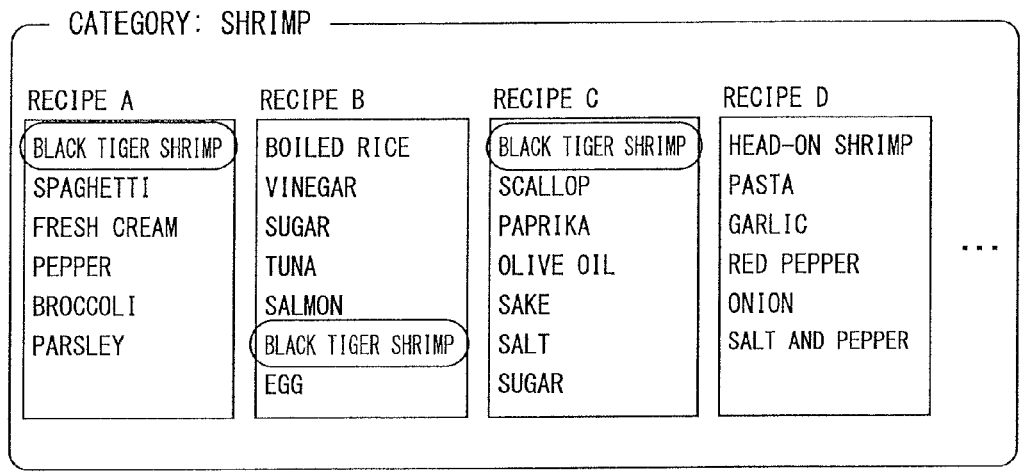

CATEGORY: SHRIMP

| RECIPE A | RECIPE B | RECIPE C | RECIPE D |
|---|---|---|---|
| BLACK TIGER SHRIMP | BOILED RICE | BLACK TIGER SHRIMP | HEAD-ON SHRIMP |
| SPAGHETTI | VINEGAR | SCALLOP | PASTA |
| FRESH CREAM | SUGAR | PAPRIKA | GARLIC |
| PEPPER | TUNA | OLIVE OIL | RED PEPPER |
| BROCCOLI | SALMON | SAKE | ONION |
| PARSLEY | BLACK TIGER SHRIMP | SALT | SALT AND PEPPER |
|  | EGG | SUGAR |  |

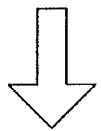

$$\frac{\text{THE NUMBER OF RECIPES IN WHICH FIRST INGREDIENT NAME IS "BLACK TIGER SHRIMP"}}{\text{THE NUMBER OF RECIPES IN WHICH "BLACK TIGER SHRIMP" IS INCLUDED AS INGREDIENT NAME}} = \frac{2}{3} = 0.67 > \text{THRESHOLD VALUE}$$

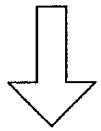

RELATED TERM

CATEGORY: SHRIMP
- "HEAD-ON SHRIMP"
- "BLACK TIGER SHRIMP"
- "VANNAMEI SHRIMP"
- "SMALL SHRIMP"
- "SWEET SHRIMP"
  .
  .
  .

FIG.6

| RANK | FREQUENCY | TF-IDF | FIRST INGREDIENT |
|---|---|---|---|
| 1 | SALT | SMALL SHRIMP | HEAD-ON SHRIMP |
| 2 | POTATO STARCH | SHRIMP | BLACK TIGER SHRIMP |
| 3 | SAKE | SHRIMP (KANJI) | VANNAMEI SHRIMP |
| 4 | WATER | SHRIMP (HIRAGANA) | SMALL SHRIMP |
| 5 | MAYONNAISE | POTATO STARCH | SWEET SHRIMP (KANJI) |
| 6 | SMALL SHRIMP | KETCHUP | SWEET SHRIMP (KATAKANA) |
| 7 | KETCHUP | SAKE | SHRIMP |
| 8 | SHRIMP (KANJI) | MAYONNAISE | SMALL SHRIMP (KATAKANA) |
| 9 | SHRIMP (KATAKANA) | SHUCKED SHRIMP | FROZEN SHUCKED SHRIMP |
| 10 | SUGAR | TOBANCHAN | SHRIMP (HIRAGANA) |

FIG.7

| ALL CATEGORIES ▼ | BLACK TIGER SHRIMP | SEARCH |

— 310

RECIPE OF BLACK TIGER SHRIMP 2 RECIPES

CATEGORY LIST
ACCOMPANYING DISH/SIDE DISH (XXX)
STAPLE FOOD (XXXX)
SNACK (XXX)
BOX LUNCH (XXX)
SAUCE/SEASONING/JAM (XXX)
SEASON/EVENT (XXX)
PURPOSE ORIENTED (XXX)
REGIONAL/NATIONAL DISH(XXXX)

CREAM SPAGHETTI OF BLACK TIGER SHRIMP
  INGREDIENTS: BLACK TIGER SHRIMP, SPAGHETTI, FRESH CREAM, PEPPER, BROCCOLI, PARSLEY
  RECIPE ID XXXXXXXXXX    PUBLISHED:XXXX.XX.XX

XXXXXXXXXXXXXXXXXXXXXX
  INGREDIENTS:XXXXXX,XXXXX,BLACK TIGER SHRIMP,XXXXXX
  RECIPE ID XXXXXXXXXX    PUBLISHED:XXXX.XX.XX

— 320

RECIPE OF INGREDIENTS RELATED TO BLACK TIGER SHRIMP  178 RECIPES

XXXXXXXXXXXXXXXXXXXXXX
  INGREDIENTS:SHRIMP,XXXX,XX,XXXXXXXXXX,XXXXX,XXX
  RECIPE ID XXXXXXXXXX    PUBLISHED:XXXX.XX.XX

XXXXXXXXXXXXXXXXXXXXXX
  INGREDIENTS:XXXXXX,HEAD-ON SHRIMP,XXXXX,XXXXX,XXX
  RECIPE ID XXXXXXXXXX    PUBLISHED:XXXX.XX.XX

XXXXXXXXXXXXXXXXXXXXXX
  INGREDIENTS:XXXXXX,SMALL SHRIMP,XXXX
  RECIPE ID XXXXXXXXXX    PUBLISHED:XXXX.XX.XX

RELATED CATEGORY
REGIONAL/NATIONAL DISH
  CHINESE DISH
    SHRIMP IN CHILI SAUCE (7)
ACCOMPANYING DISH/SIDE DISH
SEAFOOD/SEAWEED
  SHRIMP (126)

— 330

NEXT

FIG.9A

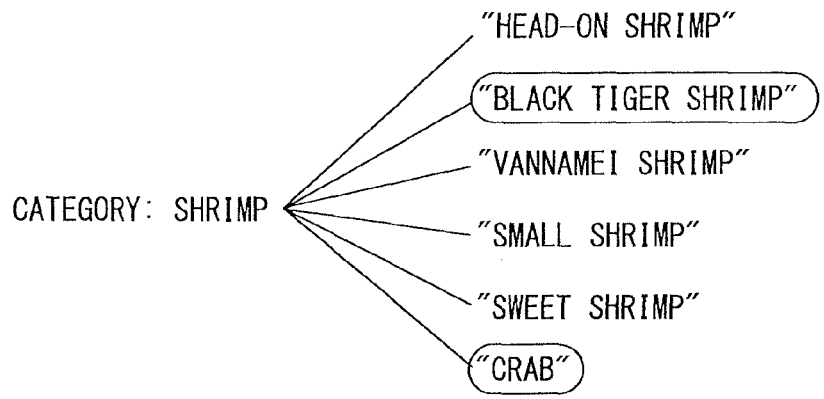

CATEGORY: SHRIMP
- "HEAD-ON SHRIMP"
- ("BLACK TIGER SHRIMP")
- "VANNAMEI SHRIMP"
- "SMALL SHRIMP"
- "SWEET SHRIMP"
- ("CRAB")

FIG.9B

RATIO OF RECIPES INCLUDING "BLACK TIGER SHRIMP" AS FIRST INGREDIENT NAME > PREDETERMINED VALUE

"BLACK TIGER SHRIMP" IS HYPONYM OF "SHRIMP"

CATEGORY RECOMMENDED TO BE NEWLY PROVIDED:
"BLACK TIGER SHRIMP"

FIG.9C

RATIO OF RECIPES INCLUDING "CRAB" AS FIRST INGREDIENT NAME > PREDETERMINED VALUE

"CRAB" IS NOT THE SAME AS "SHRIMP", NOR HYPONYM OF "SHRIMP"

RECIPE THAT IS PROBABLY CLASSIFIED INTO A WRONG CATEGORY:
RECIPE OF WHICH FIRST INGREDIENT NAME IS "CRAB"

FIG.11A
MEMBER INFORMATION DB 12a

| USER ID |
|---|
| PASSWORD |
| NICKNAME |
| NAME |
| BIRTH DATE |
| GENDER |
| POSTAL CODE |
| ADDRESS |
| PHONE NUMBER |
| EMAIL ADDRESS |

FIG.11B
CATEGORY INFORMATION DB 12b

| CATEGORY ID |
|---|
| CATEGORY NAME |
| LEVEL |
| PARENT CATEGORY ID |
| CHILD CATEGORY ID LIST |

FIG.11C
RECIPE INFORMATION DB 12c

| RECIPE ID |
|---|
| PUBLISHED DATE AND TIME |
| USER ID |
| CATEGORY ID |
| RECIPE TITLE |
| DISH NAME |
| DISH IMAGE |
| INGREDIENT INFORMATION |
| COMMENT |
| PROCEDURE INFORMATION |
| ... |

FIG.11D
INGREDIENT INFORMATION

| THE NUMBER OF TARGET PEOPLE | |
|---|---|
| INGREDIENT 1 | INGREDIENT NAME |
| | AMOUNT |
| INGREDIENT 2 | INGREDIENT NAME |
| | AMOUNT |
| ... | |

FIG.11E
RELATED TERM DB 12d

| CATEGORY ID |
|---|
| INGREDIENT NAME |
| INGREDIENT NAME |
| ... |

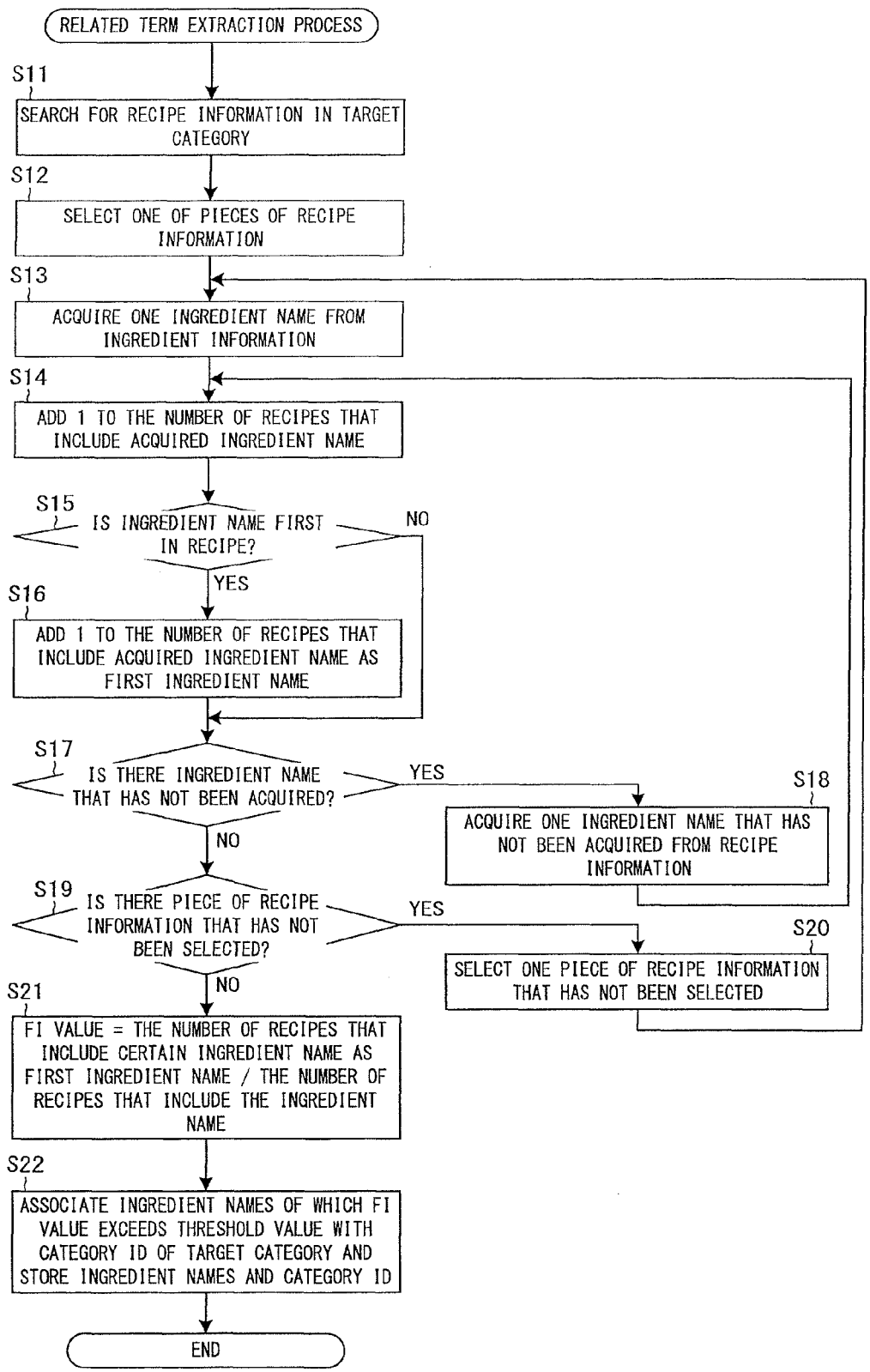

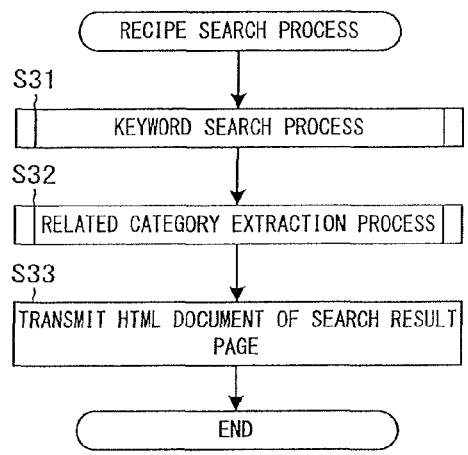
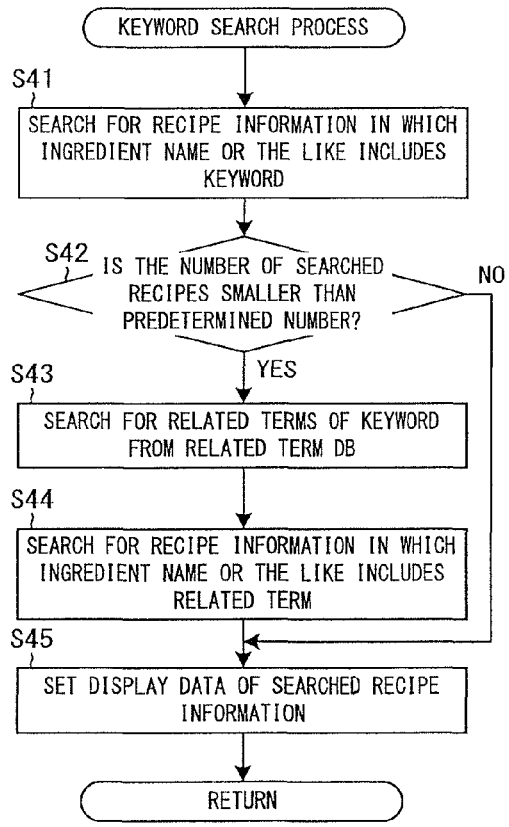
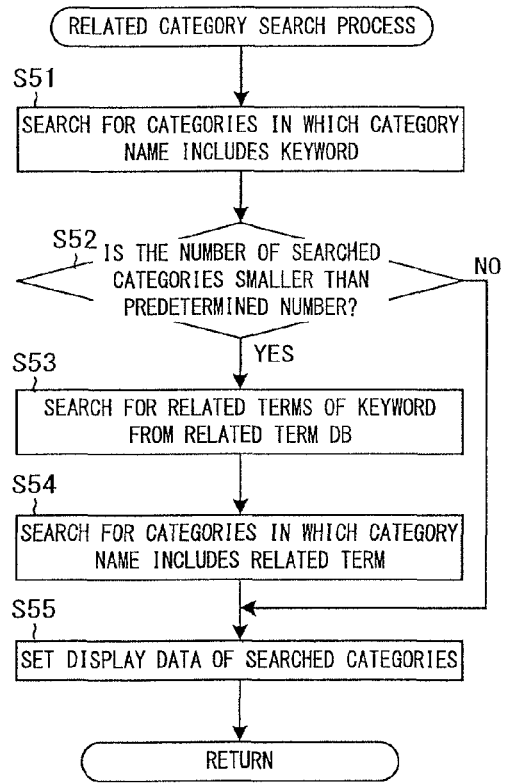

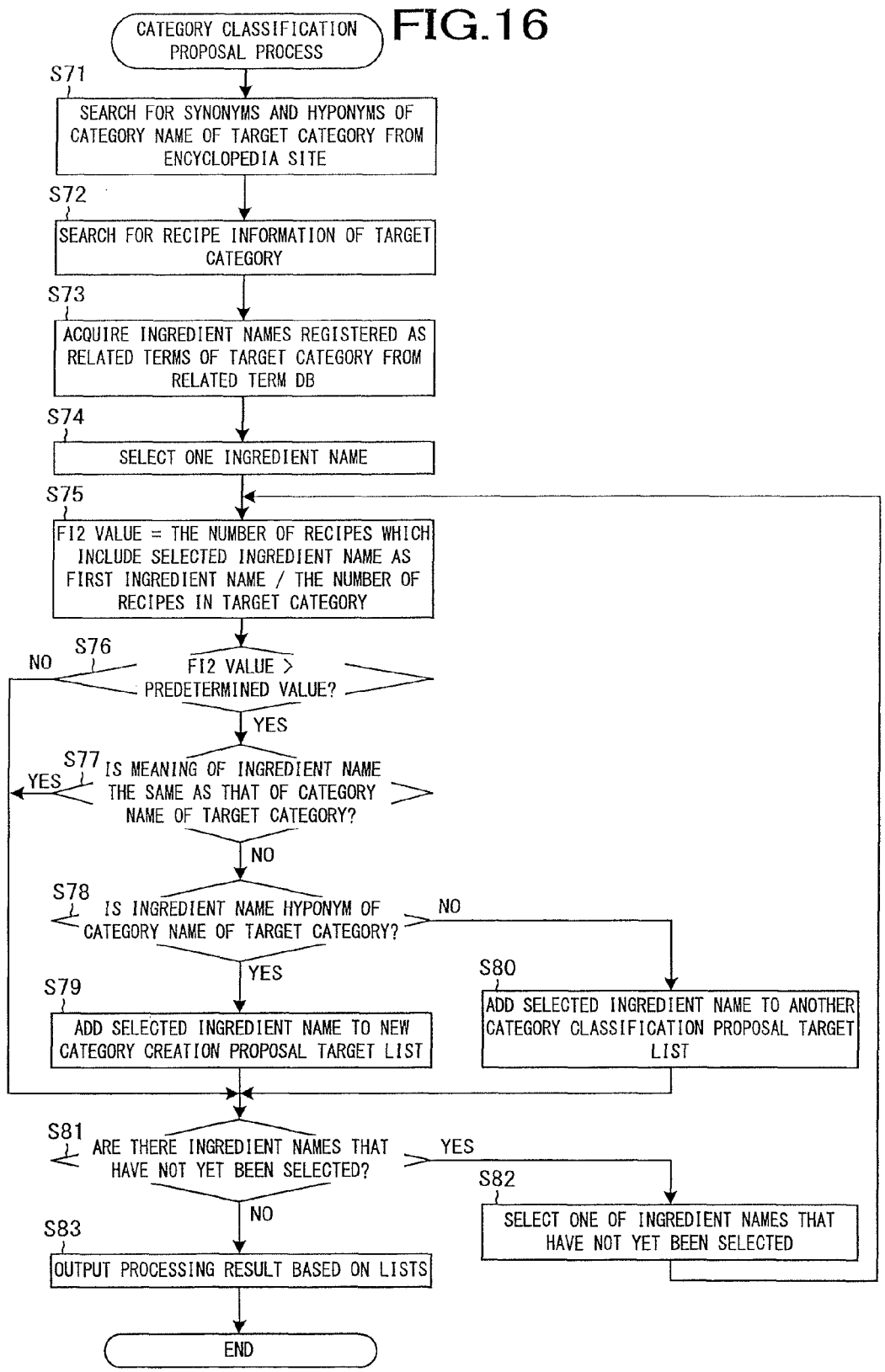

FIG.17

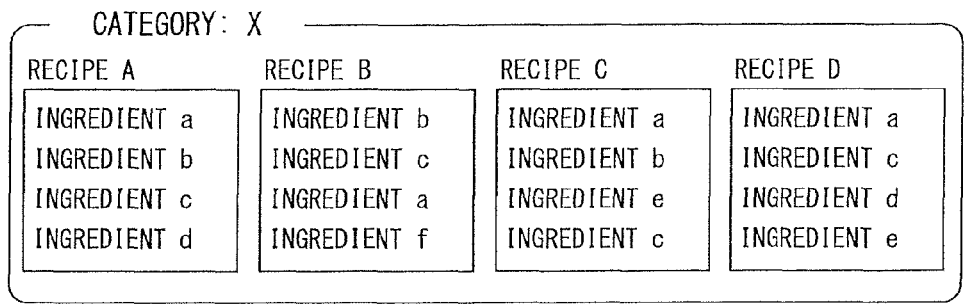

— CATEGORY: X —

| RECIPE A | RECIPE B | RECIPE C | RECIPE D |
|---|---|---|---|
| INGREDIENT a | INGREDIENT b | INGREDIENT a | INGREDIENT a |
| INGREDIENT b | INGREDIENT c | INGREDIENT b | INGREDIENT c |
| INGREDIENT c | INGREDIENT a | INGREDIENT e | INGREDIENT d |
| INGREDIENT d | INGREDIENT f | INGREDIENT c | INGREDIENT e |

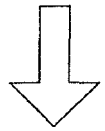

AVERAGE VALUE OF DISPLAY ORDINAL NUMBERS OF INGREDIENT a $= \dfrac{\text{SUM OF DISPLAY ORDINAL NUMBERS OF INGREDIENT a}}{\text{NUMBER OF RECIPES THAT INCLUDE INGREDIENT a}} = \dfrac{1+3+1+1}{4} = 1.5 \leqq 2.0$ AVERAGE VALUE OF DISPLAY ORDINAL NUMBERS OF INGREDIENT b $= \dfrac{2+1+2}{3} = 1.67 \leqq 2.0$ AVERAGE VALUE OF DISPLAY ORDINAL NUMBERS OF INGREDIENT c $= \dfrac{3+2+4+2}{4} = 2.75 > 2.0$

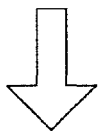

RELATED TERM

CATEGORY: X — "INGREDIENT a"
— "INGREDIENT b"

INFORMATION PROCESSING APPARATUS, INFORMATION PROCESSING METHOD, AND INFORMATION PROCESSING PROGRAM

CROSS REFERENCE TO RELATED APPLICATIONS

This application is a National Stage of International Application No. PCT/JP2013/050648, filed on Jan. 16, 2013, which claims priority from Japanese Patent Application No. 2012-144797, filed on Jun. 27, 2012, the contents of all of which are incorporated herein by reference in their entirety.

TECHNICAL FIELD

The present invention relates to a technical field of a system that presents a recipe including ingredient names.

BACKGROUND ART

Conventionally, a system is known which searches for recipes posted from users by using a specified search condition and presents the recipes. This system enables a user who posts a recipe to input, for example, ingredient names as information indicating ingredients used for cooking. The system searches for, for example, a recipe in which an ingredient indicated by an ingredient name specified as the search condition is used for cooking.

Patent Document 1 discloses a technique of storing an attribute value of each ingredient used in a recipe for each recipe, determining a similarity between a pattern of an attribute value of an ingredient for which a substitute ingredient should be presented and a pattern of an attribute value of another ingredient, and presenting an ingredient, as a substitute means, which has an attribute value of a pattern substantially similar to the pattern of the attribute value of the ingredient for which a substitute ingredient should be presented.

CITATION LIST

Patent Document

Patent Document 1: Japanese Patent Application Laid-Open No. 2000-316492

SUMMARY OF INVENTION

Technical Problem

In order to search a recipe, for example, it is conceivable to associate a plurality of ingredient names related with each other. It is conceivable that a system searches for a recipe by an ingredient name related to an ingredient name specified as a search condition.

As an extraction method of related ingredient names, for example, a method of extracting the related ingredient names based on a dictionary that defines semantic relations among terms is conceivable. The method disclosed in Patent Document 1 may be able to present a substitute ingredient of an ingredient specified by a user from among ingredients used in a recipe specified by the user. However, the user who registers a recipe has to register a plurality of attribute values of ingredients in advance. Therefore, it takes a time and effort to prepare the dictionary and register the attribute values.

Therefore, the present invention is made in view of the above situation, and an object of the present invention is to provide an information processing apparatus, an information processing method, and an information processing program, which can extract related ingredient names from ingredient names included in recipes while reducing a time and effort of a person.

Solution to Problem

In order to solve the above problem, provided is an information processing apparatus including: an ingredient name acquisition means that acquires one or more ingredient names included in each of one or more recipes included in one division of a plurality of divisions of recipes; a calculation means that, on the basis of an ordinal number of presentation of each of the ingredient names acquired by the ingredient name acquisition means in an ingredient list in the recipe, calculates a value indicating a probability that the ingredient name is a name of a main ingredient of the recipe belonging to the one division for each of the ingredient names; and an association means that associates a plurality of the ingredient names, among the ingredient names acquired by the ingredient name acquisition means, whose values calculated by the calculation means satisfy a predetermined condition with each other as related terms and stores the plurality of the ingredient names in a storage means.

There is a probability that the ordinal number of presentation of the ingredient name in an ingredient list in a recipe indicates the importance of the ingredient represented by the ingredient name in the recipe. There is a probability that the higher the importance of the ingredient, the stronger the relevance between the ingredient and the division to which the recipe is classified. According to the invention, a value indicating a probability that an ingredient name is the name of the main ingredient of the recipe belonging to the one division is calculated based on the ordinal number of presentation in the ingredient list in the recipe. Then, a plurality of ingredient names whose calculated values satisfy the condition are associated with each other as related terms. Therefore, it is possible to extract related ingredient names from ingredient names included in the recipes while reducing the time and effort of a person. The reason of this is because there is a probability that a plurality of ingredient names having certain relevance with the division to which the recipes are classified are terms related to each other.

The association means associates the ingredient names satisfying the condition with a name of the one division as related terms.

According to the invention, it is possible to extract ingredient names related to the name of the division.

The calculation means calculates a ratio of a number of the recipes in which the ordinal number of presentation of the ingredient name acquired by the ingredient name acquisition means is the first to a number of the recipes including the ingredient name for each ingredient name, and the association means associates the ingredient names whose ratios calculated by the calculation means exceed a threshold value with each other.

According to the invention, the ratio is calculated based on a result of the count of the number of recipes in which the ordinal number of presentation of a certain ingredient name is the first in the ingredient list in the recipe, so that it is possible to calculate a ratio of the number of recipes in which the ingredient represented by the ingredient name is the main ingredient. Therefore, it is possible to more accurately determine related ingredient names. The denominator of the ratio to be calculated is the number of recipes that include ingredient names that will be determined to be related or not, so that it is possible to extract an ingredient name as a related term even if the ingredient name is not used frequently in the recipe.

The information processing apparatus may further include: a condition related term acquisition means that acquires the ingredient name stored in the storage means in association with a term specified by a user as a search condition; a division search means that searches for the division whose division name includes the ingredient name acquired by the condition related term acquisition means; and a division presentation control means that causes the division found by the division search means to be presented.

According to the invention, a division whose division name includes a related term of the specified term is presented, so that it is possible to present the division highly related to matters represented by the specified term.

The division search means searches for the divisions whose division names include the specified term, and when a number of the divisions found is smaller than a predetermined number, the division search means searches for the division whose the division name includes the ingredient name acquired by the condition related term acquisition means.

According to the invention, only when the number of the divisions whose division names include the specified term is smaller than a predetermined number, the search is performed by using the related terms of the specified term. Therefore, it is possible to reduce a load in search processing while securing the number of the presented divisions.

The information processing apparatus may further include: a recipe search means that searches for a recipe by using the ingredient name acquired by the condition related term acquisition means; and a result presentation control means that causes a search result by the recipe search means to be presented.

According to the invention, the recipe is searched for by using the related term of the specified term, so that it is possible to present a recipe that the user is likely to desire.

The recipe search means searches for recipes by using the specified term, and when a number of the recipes found is smaller than a predetermined number, the recipe search means searches for the recipe by using the ingredient name acquired by the condition related term acquisition means.

According to the invention, only when the number of the recipes found by using the specified term is smaller than the predetermined number, the search is performed by using the related terms of the specified term. Therefore, it is possible to reduce a load in search processing while securing the number of the presented recipes.

The information processing apparatus may further include: a ratio determination means that determines whether or not a ratio of a number of the recipes in which the ordinal number of presentation of the ingredient name stored in the storage means is the first to a number of the recipes included in the one division exceeds a predetermined value for each ingredient name; a relation determination means that determines semantic relations between the ingredient name whose ratio is determined to exceed the value by the ratio determination means and a name of the one division; and a proposal information presentation control means that, when the meaning of the ingredient name is not the same as that of the name of the one division as a result of determination by the relation determination means, causes proposal information that proposes classifying the recipe in which the ordinal number of presentation of the ingredient name is the first into the division different from the one division to be presented.

According to the invention, when an ingredient which is frequently used as a main ingredient is not the same as matters represented by the division to which the recipe is currently classified, it is proposed that the recipe including the ingredient as the main ingredient is classified into a division different from the division to which the recipe is currently classified. Therefore, it is possible to appropriately divide the division according to the proposal.

When the relation determination means determines that the ingredient name is a hyponym of the name of the one division, the proposal information presentation control means causes the proposal information that proposes creating a new division whose division name is the ingredient name to be presented.

According to the invention, when an ingredient which is frequently used as a main ingredient is one of a plurality of types of ingredients included in the ingredients represented by the division to which the recipe is currently classified, it is proposed to create a division of the ingredient. Therefore, if an independent division of an ingredient that is frequently used as a main ingredient is created according to the proposal, it is possible to easily find recipes in which the ingredient is used as a main ingredient by specifying the division.

When the relation determination means determines that the meaning of the ingredient name is not the same as that of the name of the one division and the ingredient name is not a hyponym of the name of the one division, the proposal information presentation control means causes the proposal information indicating that there is a probability that the recipe in which the ordinal number of presentation of the ingredient name is the first is classified into a wrong division to be presented.

According to the invention, when an ingredient which is frequently used as a main ingredient is not the same as the ingredient represented by the division to which the recipe is currently classified and the ingredient is not an ingredient included in the ingredient represented by the division, it is indicated that there is a probability that the recipe including the ingredient as the main ingredient is currently classified into a wrong division. Therefore, it is possible to re-classify the recipe into a correct division according to the proposal.

The information processing apparatus may further include: an ingredient name related term acquisition means that acquires the ingredient name stored in the storage means in association with at least one ingredient name among one or more ingredient names included in the recipe requested by a user; and an ingredient name presentation control means that causes the ingredient names acquired by the ingredient name related term acquisition means to be presented.

According to the invention, a related term of an ingredient used in the requested recipe is presented. Therefore, it is possible to present a substitute ingredient of an ingredient used in the requested recipe.

An information processing method may be performed by a computer, the method including: an ingredient name acquisition step of acquiring one or more ingredient names included in each of one or more recipes included in one division of a plurality of divisions of recipes; a calculation step of, on the basis of an ordinal number of presentation of each of the ingredient names acquired in the ingredient name acquisition step in an ingredient list in the recipe, calculating a value indicating a probability that the ingredient name is a name of a main ingredient of the recipe belonging to the one division for each of the ingredient names; and an association step of associating a plurality of the ingredient names, among the ingredient names acquired in the ingredient name acquisition step, whose values calculated in the calculation step satisfy a predetermined condition with each other as related terms and stores the plurality of the ingredient names in a storage means.

An information processing program causes a computer to function as: an ingredient name acquisition means that acquires one or more ingredient names included in each of one or more recipes included in one division of a plurality of divisions of recipes; a calculation means that, on the basis of an ordinal number of presentation of each of the ingredient names acquired by the ingredient name acquisition means in an ingredient list in the recipe, calculates a value indicating a probability that the ingredient name is a name of a main ingredient of the recipe belonging to the one division for each of the ingredient names; and an association means that associates a plurality of the ingredient names, among the ingredient names acquired by the ingredient name acquisition means, whose values calculated by the calculation means satisfy a predetermined condition with each other as related terms and stores the plurality of the ingredient names in a storage means.

Advantageous Effect of Invention

According to the present invention, a value indicating a probability that an ingredient name is the name of the main ingredient of the recipes belonging to the one division is calculated based on the ordinal number of presentation in the ingredient list in the recipe. Then, a plurality of ingredient names whose calculated values satisfy the condition are associated with each other as related terms. Therefore, it is possible to extract related ingredient names from ingredient names included in the recipes while reducing the time and effort of a person.

BRIEF DESCRIPTION OF DRAWINGS

FIG. 2A is a diagram illustrating a display example of an ingredient setting window.

FIG. 2B is a diagram illustrating a display example of the ingredient setting window when names of ingredients of spaghetti using black tiger shrimp are input.

FIG. 4 is a diagram illustrating an extraction example of related terms.

FIG. 6 is a diagram illustrating an example of ingredient names of which index value is high.

FIG. 7 is a diagram illustrating a display example of a search result page when a keyword is specified.

FIG. 9A is an example of extracted related terms. FIG. 9B is a diagram illustrating a proposal example of newly creating a category. FIG. 9C is a diagram illustrating a proposal example of classifying into a correct category.

FIG. 11A is a diagram illustrating an example of content registered in a member information DB 12a. FIG. 11B is a diagram illustrating an example of content registered in a category information DB 12b. FIG. 11C is a diagram illustrating an example of content registered in a recipe information DB 12c. FIG. 11D is a diagram illustrating an example of content included in ingredient information. FIG. 11E is a diagram illustrating an example of content registered in a related term DB 12d.

FIG. 13 is a flowchart illustrating a process example of a related term extraction process of a system control unit 14 of the recipe server 1 according to an embodiment.

FIG. 14A is a flowchart illustrating a process example of a recipe search process of the system control unit 14 of the recipe server 1 according to an embodiment. FIG. 14B is a flowchart illustrating a process example of a keyword search process of the system control unit 14 of the recipe server 1 according to an embodiment. FIG. 14C is a flowchart illustrating a process example of a related category search process of the system control unit 14 of the recipe server 1 according to an embodiment.

FIG. 16 is a flowchart illustrating a process example of a categorization proposal process of the system control unit 14 of the recipe server 1 according to an embodiment.

FIG. 17 is a diagram illustrating an extraction example of related terms.

DESCRIPTION OF EMBODIMENTS

Hereinafter, an embodiment of the present invention will be described in detail with reference to the drawings. The embodiment described below is an embodiment where the present invention is applied to an information processing system.

1. Schematic Configuration and Function of Information Processing System

Figure 1:
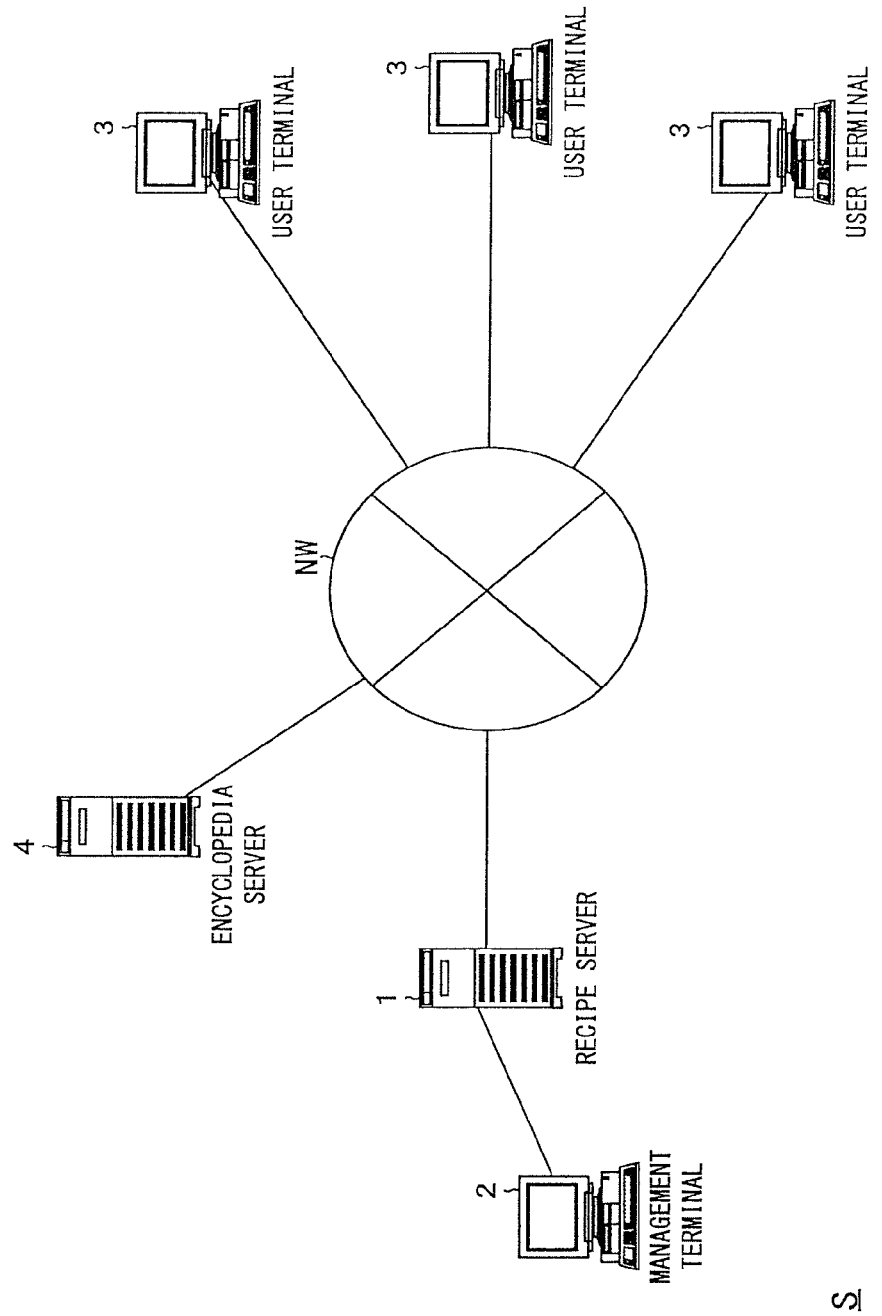
FIG. 1 is a diagram illustrating an example of a schematic configuration of an information processing system S according to an embodiment.

First, a schematic configuration and functions of an information processing system S according to the present embodiment will be described with reference to FIG. 1. FIG. 1 is a diagram illustrating an example of a schematic configuration of the information processing system S according to the present embodiment.

As illustrated in FIG. 1, the information processing system S includes a recipe server 1, a management terminal 2, a plurality of user terminals 3, and an encyclopedia server 4. The recipe server 1, each user terminal 3, and the encyclopedia server 4 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway. The recipe server 1 and the management terminal 2 can transmit and receive data to and from each other through, for example, a LAN (Local Area Network).

The recipe server 1 is a server device that performs various processes related to a recipe site. The recipe server 1 is an example of an information processing apparatus of the present invention. The recipe site is a web site that receives posting of cooking recipes from users and publishes the posted recipes on web pages. For example, the recipe server 1 transmits a web page of the recipe site, performs a process to register a posted recipe, and performs a process to search for a recipe, according to a request from the user terminal 3.

The management terminal 2 is a terminal device used by an administrator of the recipe site. For example, the administrator uses the management terminal 2 to operate the recipe server 1 and acquire information from the recipe server 1. For example, a personal computer is used as the management terminal 2.

The user terminal 3 is a terminal device of a user who uses various web sites. The user terminal 3 accesses a server device such as the recipe server 1 based on an operation from a user. Thereby, the user terminal 3 receives a web page from the server device and displays the web page. In the user terminal 3, software such as a browser and an email client is installed. For example, a personal computer, a PDA (Personal Digital Assistant), a mobile information terminal such as a smartphone, and a mobile phone are used as the user terminal 3.

The encyclopedia server 4 is a server device that performs various processes related to an encyclopedia site. The encyclopedia site is a web site that publishes descriptions related to various matters. The encyclopedia server 4 transmits a web page that carries a description related to a matter indicated by a term transmitted from the user terminal 3 or the recipe server 1. The web page may include information of synonyms, quasi-synonyms, hyponyms, and the like of the received term.

2. Posting of Recipe and Display of Recipe

Next, posting of recipe and display of recipe will be described with reference to FIGS. 2 and 3.

A user who posts a recipe in the recipe site inputs information of the recipe. The recipe server 1 registers the input information. Thereby, the recipe is posted. The information related to the recipe is referred to as "recipe information". The recipe information includes identification information of category of the recipe and names of ingredients used in the recipe. The name of the ingredient is referred to as an "ingredient name".

FIG. 2A is a diagram illustrating a display example of an ingredient setting window. When a web page for inputting information of a recipe is being displayed on a screen of the user terminal 3, the user performs an operation for setting the ingredients. Then, as illustrated in FIG. 2A, the ingredient setting window is displayed on the screen of the user terminal 3. The ingredient setting window includes a plurality of ingredient setting areas 110-*n* and a save button 120. Here, n indicates an ordinal number showing a position of an ingredient name among ingredient names in the recipe. When a list of the ingredients is displayed, this ordinal number corresponds to a display ordinal number showing a position of the ingredient name among the ingredient names arranged in order of display in the list. The display ordinal number is an example of an ordinal number of presentation in the present invention. In the ingredient setting window, n indicates a display ordinal number of the ingredient setting areas 110-*n*. A plurality of ingredient setting areas 110-*n* are sequentially displayed in a downward direction, for example, in an order of the ingredient setting areas 110-1 and the ingredient setting areas 110-2. Each of the ingredient setting areas 110-*n* is an area for inputting information of one ingredient. The ingredient setting area 110-*n* includes an input field of an ingredient name and an input field of the amount. Although two ingredient setting areas 110-*n* are displayed in FIG. 2A, it is possible to increase or decrease the number of the ingredient setting areas 110-*n* by an operation of the user. Further, it is possible to switch the display ordinal number of one ingredient setting area 110-*n* with the display ordinal number of another ingredient setting area 110-*n*.

FIG. 2B is a diagram illustrating a display example of the ingredient setting window when names of ingredients of spaghetti using black tiger shrimp are input. The black tiger shrimp is another name of giant tiger prawn. As illustrated in FIG. 2B, the user inputs "black tiger shrimp", "spaghetti", "fresh cream", "pepper", "broccoli", and "parsley" in the ingredient setting areas 110-1 to 110-6 as the ingredient names. When the user selects the save button 120, the input ingredient names are saved and the web page for inputting information of a recipe is displayed again.

After inputting various information, the user performs an operation to publish the recipe. Then, a web page for selecting a category where the posted recipe is registered is displayed on the screen of the user terminal 3. In this web page, the user hierarchically selects the category. When the category is selected, the posting of the recipe is completed. The categories of recipe are divided in view of, for example, ingredient, dish, season, event, purpose, and the like. The category is an example of a division in the present invention. When the categories of recipe are classified by hierarchy, there are large categories, intermediate categories, and small categories. The large category is a category at the first (highest) hierarchy level, the intermediate category is a category at the second hierarchy level, and the small category is a category at the third (lowest) hierarchy level. Examples of the large category include "accompanying dish/side dish", "staple food", "snack", and "box lunch". Examples of the intermediate category under the "accompanying dish/side dish" include "vegetable", "meat", "seafood/seaweed", and "mushroom and edible wild plant". Examples of the intermediate category under the "seafood/seaweed" include "horse mackerel", "short-neck clam", "squid", "sardine", "shrimp", and "other seafood".

As described above, among the categories under the "accompanying dish/side dish", there are categories where the recipe is classified by an ingredient to be used. When the type of dish is neither the accompanying dish nor the side dish, the user may select a category under the "accompanying dish/side dish" according to the ingredient to be used. For example, as illustrated in FIG. 2B, when the user inputs information of an ingredient of the staple food, the user may select the "staple food" as the large category. However, the user can assume that the black tiger shrimp is the main ingredient of the dish. In this case, the user may select the "accompanying dish/side dish" as the large category, select "seafood/seaweed" as the intermediate category, and select "shrimp" as the small category. The small category that indicates an ingredient to be used is referred to as an "ingredient category".

Figure 3:
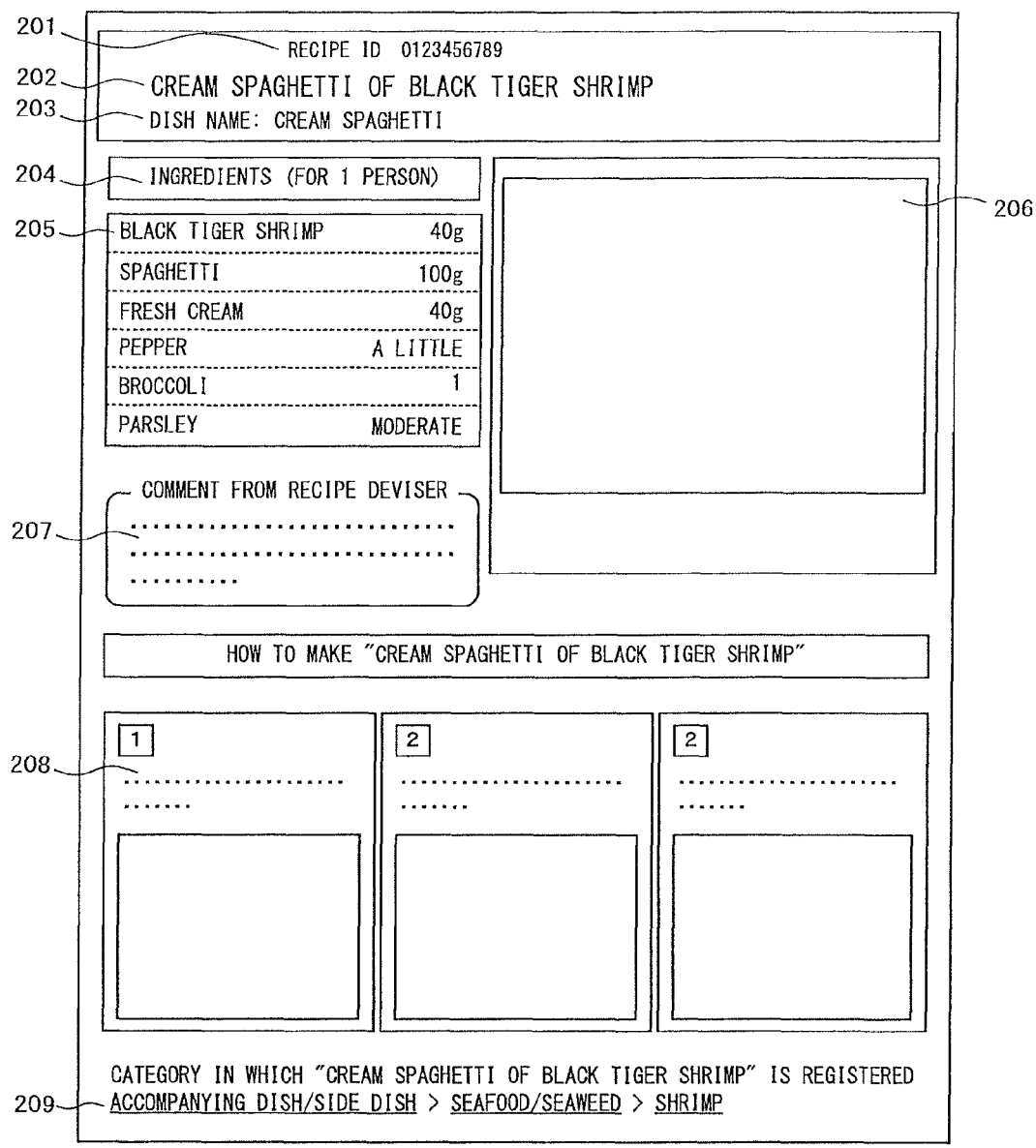
FIG. 3 is a display example of a recipe page.

FIG. 3 is a display example of a recipe page. The recipe page is a web page on which information of the posted recipe is displayed. As illustrated in FIG. 3, in the recipe page, a recipe ID 201, a recipe title 202, a dish name 203, the number of target people 204, an ingredient display field 205, a dish image 206, a comment 207, procedure display fields 208, and a category 209 are displayed. The recipe ID 201 is identification information of the recipe. The number of target people 204 indicates food for how many people can be made by the amount of ingredients displayed in the ingredient display field 205. In the ingredient display field 205, a list of the ingredients is displayed. Specifically, in the ingredient display field 205, an ingredient name and the amount are displayed for each ingredient. The display order of the ingredient names in the ingredient display field 205 corresponds to the display order of the ingredient names input in the ingredient setting window. One or more procedure display fields 208 are displayed. In the procedure display field 208, a text and an image for explaining the procedure of cooking is displayed.

The category 209 indicates the large category, the intermediate category, and the small category, where the recipe is posited.

3. Extraction of Related Term 3-1. Extraction Method

Next, a method of extracting a related ingredient name will be described with reference to FIG. 4.

The recipe server 1 aggregates ingredient names based on order of the ingredient names in each piece of recipe information classified into a certain category. Then, the recipe server 1 extracts a plurality of ingredient names related to each other based on the aggregation result. The related term in the present embodiment includes synonym, quasi-synonym, hypernym, hyponym, and the like. The synonym in the present embodiment includes a plurality of terms whose meanings are the same even though at least a part of characters used in the terms are different from each other. Therefore, the synonym includes terms of which notations are only different. For example, "shrimp" written in kanji characters, "shrimp" written in hiragana characters, and "shrimp" written in katakana characters are synonym to each other. The synonym includes terms of which characters are partially different from each other due to orthographic variation, and abbreviations.

When posting a recipe, the user tends to determine the display order of the ingredients in the recipe information according to the importance of the ingredients. For example, there is a probability that the smaller the display ordinal number of the ingredient, the more important the ingredient is. We consider that there is some relevance between the importance of the ingredient and the category to which the recipe is classified. The reason of this is because the importance of the ingredient is one of the factors that determine the features, the characteristics, and the like of the recipe and the dish made from the recipe; and the category is determined by the user according to the characteristics and the like of the recipe and the dish. In particular, there is a high probability that the main ingredient is the ingredient that determines the features of the dish to be made. When the user classifies the recipe into an ingredient category, there is a high probability that the user classifies the recipe into an ingredient category to which the main ingredient is classified. In this case, there is a probability that the ingredient name of the main ingredient is the same as the category name of the ingredient category to which the recipe is classified or the ingredient name of the main ingredient is a synonym or a hyponym of the category name. In other words, the ingredient name of the main ingredient is a related term of the category name. Further, there is a probability that the ingredient name of the main ingredient of each recipe classified into an ingredient category is a synonym or a hyponym of the category name of the ingredient category, so that there is a probability that main ingredients in recipes classified into the same ingredient category are terms related to each other. When the display order of the ingredients is determined according to the importance of the ingredients, the main ingredient is the first ingredient. Therefore, there is a high probability that the user inputs the name of the main ingredient as the first ingredient name.

Therefore, for each ingredient name, the recipe server 1 calculates a ratio of pieces of recipe information that include the ingredient name as the first ingredient to pieces of recipe information that include the ingredient name among pieces of recipe information classified into a certain category. The ratio is referred to as an FI (First Ingredient) value. When the FI value of a certain ingredient name exceeds a predetermined threshold value, the recipe server 1 extracts the ingredient name as a related term. When the FI value of an ingredient name i in a small category c is FI(i, c), the FI value is calculated by the following formula 1:

$$FI(i, c) = \frac{oc1(i, c)}{oc(i, c)} \quad \text{[Mathematical Formula 1]}$$

In the formula 1, oc(i, c) is the number of pieces of recipe information that include the ingredient name i among pieces of recipe information that are classified into the small category c. Further, oc1(i, c) is the number of pieces of recipe information that include the ingredient name i as an ingredient name whose display ordinal number is the first among the pieces of recipe information that are classified into the small category c. Calculating the oc(i, c) and the oc1(i, c) for each ingredient name is an example of aggregating the ingredient names. The condition that the FI value exceeds the threshold value is an example of a predetermined condition.

A specific example will be described below. FIG. 4 is a diagram illustrating an extraction example of a related term. It is assumed that the category c is "shrimp" and the ingredient name i is "black tiger shrimp". As illustrated in FIG. 4, the "black tiger shrimp" is included in only recipes A, B, and C among pieces of the recipe information that are classified into the "shrimp". The ordinal number of the "black tiger shrimp" in the recipes A and C is the first. On the other hand, the ordinal number of the "black tiger shrimp" in the recipe B is the sixth. Therefore, the FI value of the "black tiger shrimp" is 0.67. If the threshold value is 0.5, the FI value of the "black tiger shrimp" exceeds the threshold value. Therefore, the recipe server 1 associates the "black tiger shrimp" with the category name "shrimp" as a related term. The recipe server 1 associates ingredient names, such as "head-on shrimp", "vannamei shrimp", "small shrimp", and "sweet shrimp", whose FI value exceeds the threshold value, with the category name "shrimp". Thereby, a plurality of ingredient names are associated with the category name as related terms and the plurality of ingredient names are associated with each other as related terms. As a result of the extraction of related terms, an ingredient name that is the same as the category name may be extracted. For example, the ingredient name "shrimp" may be extracted for the category name "shrimp". In this case, for convenience, the category name and the ingredient name are assumed to be terms related to each other. The recipe server 1 may not associate the extracted ingredient name with the category name and may associate only the ingredient names with each other.

3-2. Verification of Method Using FI Value

Next, a verification result of extraction of a related term by the method using the FI value will be described with reference to FIGS. 5 and 6.

The applicant of the present invention performed verification by collecting data from a web site operated by the applicant in order to clarify the effectiveness of the extraction method that uses the FI value. As a method that uses an index different from the FI value, for example, a method that uses frequency and a method that uses TF-IDF (Term Frequency—Inverse Document Frequency) are considered. Therefore, the applicant compared the extraction results of a related term between the method that uses FI value, the method that uses frequency and the method that uses TF-IDF.

The frequency FR(i, c) of the ingredient name i in the small category c is calculated by the formula 2 below. When the frequency FR(i, c) exceeds a threshold value, the ingredient name i is extracted as a related term.

$$FR(i,c) = oc(i,c) \quad \text{[Mathematical Formula 2]}$$

The TFIDF(i, c) of the ingredient name i in the small category c is calculated by the formula 3 below. When the TFIDF(i, c) exceeds a threshold value, the ingredient name i is extracted as a related term.

$$TFIDF(i,c) = TF(i,c) \cdot IDF(i,c) \quad \text{[Mathematical Formula 3]}$$

In FIG. 2, TF(i, c) and IDF(i, c) are calculated by the formulas below.

$$TF(i, c) = \frac{oc(i, c)}{in(c)} \quad \text{[Mathematical Formula 4]}$$

$$IDF(i, c) = \log \frac{CN}{cn(i)} \quad \text{[Mathematical Formula 5]}$$

In the formula 4, I is a set of the ingredient names used in the recipe information of the small category c. In the formula 4, in(c) is a total number of the ingredient names appearing in the small category c. In the formula 5, CN is a total number of the small categories. In the formula 5, cn(i) is the number of categories where at least one piece of recipe information includes the ingredient name i among the small categories other than the small category c.

The applicant calculated the FI value, the frequency, and the TF-IDF for the ingredient categories by using the formulas 1 to 5. Then, the applicant calculated the precision ratio, the recall ratio, and the F-score when setting threshold values between 0.1 and 0.9 for each of the FI value, the frequency, and the TF-IDF. The applicant performed normalization so that the values of the frequency and the TF-IDF are within a range from 0 to 1. The precision ratio P, the recall ratio R, and the F-score FS are calculated by the following formulas.

$$P = \frac{X \cap Y}{Y} \quad \text{[Mathematical Formula 6]}$$

$$R = \frac{X \cap Y}{Z} \quad \text{[Mathematical Formula 7]}$$

$$FS = 2\frac{P \cdot R}{P + R} \quad \text{[Mathematical Formula 8]}$$

In the formulas 6 and 7, X is a set of combinations of a category name and an ingredient name that are correct related terms. Y is a set of combinations of a category name and an ingredient name that are actually determined as related terms. Z is a set of all combinations of a category name and an ingredient name.

Figure 5A:
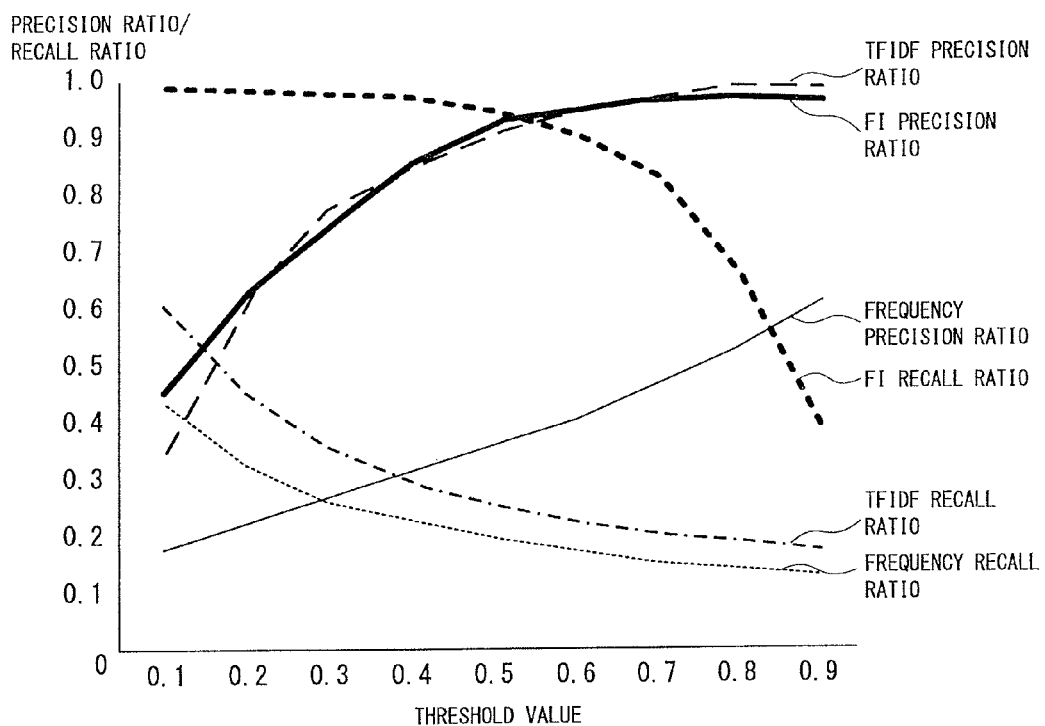
FIG. 5A is a graph illustrating an example of a relationship between a threshold value and a precision ratio and a relationship between a threshold value and a recall ratio.

FIG. 5A is a graph illustrating an example of a relationship between the threshold value and the precision ratio and a relationship between the threshold value and the recall ratio. In general, the higher the threshold value is, the higher the precision ratio is, and the higher the threshold value is, the lower the recall ratio is. As illustrated in FIG. 5A, the precision ratio when the FI value is used is higher than the precision ratio when the other methods are used at any threshold value. The recall ratio when the FI value is used is substantially the same as the recall ratio when the TF-IDF is used. The recall ratio when the FI value is used is higher than the recall ratio when the frequency is used at any threshold value.

Figure 5B:
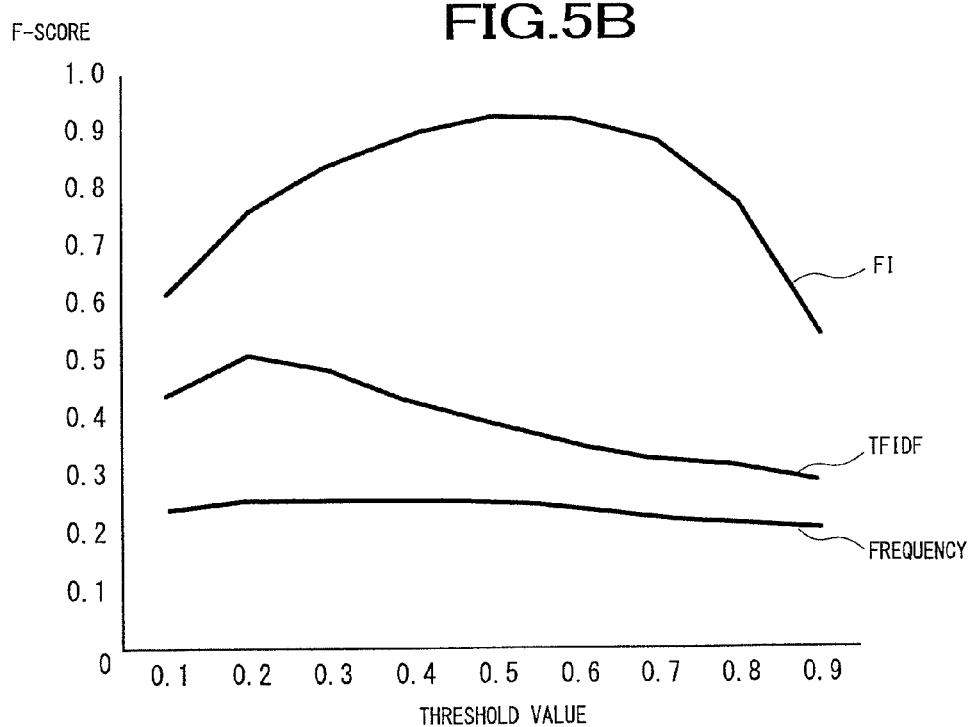
FIG. 5B is a graph illustrating an example of a relationship between a threshold value and an F-score.

FIG. 5B is a graph illustrating an example of a relationship between the threshold value and the F-score. As illustrated in FIG. 5B, the F-score when the FI value is used is higher than the F-score when the other methods are used at any threshold value. For example, when the threshold value is between 0.3 and 0.7, the F-score exceeds 0.8, and when the threshold value is 0.5 and 0.6, the F-score exceeds 0.9. The lowest F-score exceeds 0.5. On the other hand, the highest F-score when using the method that uses the TF-IDF is about 0.5. The highest F-score when the frequency is used does not exceed 0.3.

FIG. 6 is a diagram illustrating an example of ingredient names of which index value is high in each of the frequency, the TF-IDF, and the FI value. FIG. 6 illustrates ingredient names from the first place to the tenth place for the category "shrimp". When the frequency is used, seven ingredient names among the top 10 ingredient names are ingredient names not related to the "shrimp". For example, the ingredient names from the first place to the fifth place are "salt", "potato starch", "sake", "water", and "mayonnaise". The reason of this is because the frequency of names of ingredients such as seasonings frequently used in dishes in any category is high. This is assumed to be the cause of the low recall ratio. The frequency of the ingredient name which is a related term of the "shrimp" but is not used frequently is low. This is assumed to be the cause of the low precision ratio.

When the TF-IDF is used, the ingredient names from the first place to the fourth place are related terms of the "shrimp". However, five ingredient names among the top 10 ingredient names are ingredient names not related to the "shrimp". For, example, there are "potato starch", "sake", "ketchup", and the like. The reason of this is because, when making a dish using shrimp, the TF-IDF of the name of ingredient that is frequently used along with shrimp is high. This is assumed to be the cause of the low recall ratio.

When the FI value is used, all of the top 10 ingredient names are related terms of the "shrimp". In this way, according to the method using the FI value, it is possible to accurately extract the related terms. In the formula 1 that calculates the FI value, the denominator is the number of pieces of recipe information which include the ingredient name i, so that the recipe server 1 can extract an ingredient name as a related term even if the ingredient name is not used frequently. Thereby, for example, it is possible to extract a name of a new ingredient as a related term. Further, it is possible to extract an ingredient name where only the notation is different as a related term. Further, it is possible to extract an abbreviation as a related term. Further, it is possible to extract terms of which characters are partially different from each other due to orthographic variation as related terms. Further, it is possible to extract names of ingredients of which forms are different from each other as related terms. For example, "shrimp", "frozen shrimp", "shucked shrimp", and "boiled shrimp" can be extracted as terms related to each other.

Further, the recipe server 1 does not need to analyze characters of the ingredient name and the category name to extract a related term. When extracting related terms by analyzing characters, it is not possible to extract terms whose characters are not similar but whose meanings are related to each other as related terms. However, the recipe server 1 can extract terms whose characters are not similar but whose meanings are related to each other as related terms by the method using the FI value. Further, the recipe server 1 need not use information of some dictionary or encyclopedia. Therefore, an administrator need not create or prepare information of a dictionary or the like in advance. When extracting a related term by using information of a dictionary or the like, it is not possible to extract a term which is not registered in the dictionary of the like as a related term. However, regardless of whether or not a term is registered in some dictionary or the like, the recipe server 1 can extract the term as a related term by the method using the FI value. Further, when posting a recipe, a user does not need to input attributes unnecessary to make a dish among attributes of the ingredients. Therefore, it is possible to reduce the time and effort of the administrator and the user. The ingredient name and the amount of ingredient are information necessary to make a dish.

The administrator can arbitrarily determine the threshold value of the FI value. For example, the administrator may cause the recipe server 1 to use a threshold value that makes the F-score the highest.

An example has been described in which a category where a related term is extracted is applied to the ingredient category. However, a related term may be extracted from a category other than the ingredient category by the method using the FI value. For example, when categories are divided by the type of dish, the category where a related term is extracted can be applied to a category where the main ingredient can be identified from the dish name which is the category name. For example, the main ingredient of shrimp in chili sauce is generally shrimp. The main ingredient of French bread is generally Lys D'or. There is a high probability that an extracted ingredient name is the name of the main ingredient, so that it is possible to associate a plurality of extracted ingredient names with each other as related terms. In this case, whether or not to determine the extracted ingredient names to be related terms of the category name depends on the cases.

An example has been described in which the FI value of a certain ingredient is calculated based on the number of recipes in which the display ordinal number of the ingredient name is the first. However, it is not limited to the recipes in which the display ordinal number of the ingredient name is the first. For example, the recipe server 1 may calculate an index value corresponding to the FI value based on the number of recipes in which the display ordinal number of a certain ingredient name is smaller than or equal to a predetermined ordinal number. Further, for example, the recipe server 1 may calculate an index value corresponding to the FI value based on the number of recipes in which the display ordinal number of a certain ingredient name is smaller than or equal to an ordinal number within a predetermined ratio from the top. In these cases, the numerator of the formula 1 may be changed. The administrator can arbitrarily determine the order and/or the ratio.

3-3. Use of Related Term

Next, an example of use of an extracted related term will be described with reference to FIGS. 7 to 9.

3-3-1. Search Using Keyword

When searching a recipe, a user can specify a keyword and a category as a search condition. When a keyword is specified, the recipe server searches for recipe information in which the specified keyword is included in the title, the dish name, the ingredient names, the comment, the procedure description, and the like. The user can select a keyword by limiting the search range to the ingredient names. In this case, the recipe server 1 searches for recipe information in which the specified keyword is included in an ingredient name. Then, the recipe server 1 causes the user terminal 3 to present the search result to the user.

When a related term of the specified keyword is registered, the recipe server 1 may search for recipes by using the related term as a keyword as well as search for recipes by using the specified keyword. Thereby, even when search omission occurs by the keyword specified by the user due to, for example, orthographic variation, use of abbreviation, presence of synonym, and the like, it is possible to search for recipes desired by the user. Further, it is possible to increase the number of recipes selectable by the user within an appropriate range. Here, at first, the recipe server 1 may search for recipes by using only the specified keyword. As a result of the search, only when the number of the recipes found is smaller than or equal to a predetermined number, the recipe server 1 may search for recipes by using the related term. The reason of this is because it is not necessary to search for recipes by using the related term if a certain number of recipes are found. Thereby, it is possible to reduce the processing load of the recipe server 1.

FIG. 7 is a diagram illustrating a display example of a search result page when a keyword is specified. The search result page is a web page on which the search result of recipes is displayed. As illustrated in FIG. 7, the search result page includes a main search result display area 310. In the main search result display area 310, a list of recipes found by using the keyword specified by the user is displayed. For example, recipe title, dish image, ingredient name, recipe ID, or the like are displayed for each recipe. FIG. 7 illustrates an example of a case in which "black tiger shrimp" is specified as the keyword. Therefore, in the main search result display area 310, a list of recipes whose ingredient names or the like include "black tiger shrimp" is displayed. If there is no recipe that includes "black tiger shrimp", the main search result display area 310 is not displayed.

If recipes are found by using related terms, a sub-search result display area 320 is displayed in the search result page. In the sub-search result display area 320, a list of recipes found by using related terms of the keyword specified by the user is displayed. For example, a list of recipes whose ingredient names or the like include "head-on shrimp", "vannamei shrimp", "small shrimp", "sweet shrimp", "shrimp" written in hiragana characters, "shrimp" written in katakana characters, or the like is displayed.

When the user selects any one of the recipes in the main search result display area 310 or the sub-search result display area 320, the recipe page of the selected recipe is displayed on the screen of the user terminal 3.

The recipe server 1 may generate the search result page so that the search results are displayed in one area by eliminating the distinction between the recipes found by using the specified keyword and the recipes found by using the related terms.

3-3-2. Presentation of Related Category

When the recipe server 1 searches for recipes by using a keyword specified as the search condition, the recipe server 1 searches for related categories of the specified keyword. The related category is a category related to the keyword. Specifically, the recipe server 1 searches for categories whose category names include the keyword as the related categories. The recipe server 1 causes the user terminal 3 to present the found related categories to the user.

When a related term of the specified keyword is registered, the recipe server 1 may search for related categories by using the related term as well as search for related categories by using the specified keyword. Thereby, even when search omission occurs by the keyword specified by the user due to, for example, orthographic variation, use of abbreviation, presence of synonym, and the like, it is possible to cause appropriate related categories to be presented. There is a probability that a category related to a related term of the keyword is a category related to the keyword. Therefore, it is possible to increase the number of selectable related categories within an appropriate range. Here, at first, the recipe server 1 may search for related categories by using only the specified keyword. As a result of the search, only when the number of the found related categories is smaller than or equal to a predetermined number, the recipe server 1 may search for related categories by using the related term. The reason of this is the same as that in the case of the search of recipes.

As illustrated in FIG. 7, in the search result page, a related category display area 330 is also displayed. The related category display area 330 is an area in which a list of related categories is displayed. When a category name of a small category or an intermediate category includes at least one of the specified keyword and the related terms, the category names of higher categories of the category are also displayed. In the example in FIG. 7, "shrimp in chili sauce", "shrimp", and the like are displayed as related categories. This is a result when related categories are found by the related terms of "black tiger shrimp".

Beside the category name of the small category, the number of recipes is displayed which was found by at least one of the specified keyword and the related terms among the recipes of the category indicated by the category name. When the user selects any one of the categories in the related category display area 330, the recipe server 1 searches for recipes by using both the specified keyword and the selected category as a search condition.

The recipe server 1 may generate the search result page so that the related categories found by using the specified keyword and the related categories found by using the related terms are displayed separately or may generate the search result page so that these search results are displayed together.

3-3-3. Presentation of Substitute Ingredient

When the recipe server 1 causes the user terminal 3 to display the recipe page, the recipe server 1 may cause the user terminal 3 to present the related terms of an ingredient included in the recipe information to the user as substitute ingredients of the ingredient used in the recipe.

Figure 8:
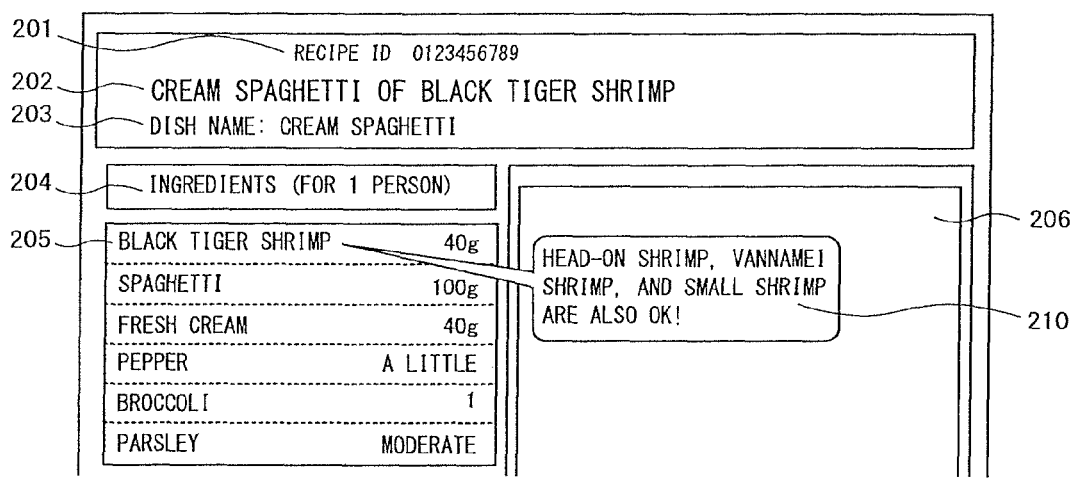
FIG. 8 is a display example of substitute ingredients in a recipe page.

FIG. 8 is a display example of the substitute ingredients in the recipe page. For example, when related terms of any one of the ingredient names displayed on the recipe page are registered, a balloon 210 is displayed on the recipe page. In the balloon 210, the names of the substitute ingredients are displayed. The balloon 210 points at the name of the ingredient which is substituted for. In the example in FIG. 8, "black tiger shrimp" is displayed as an ingredient name and further a sentence "head-on shrimp, vannamei shrimp, and small shrimp are also OK!" is displayed in the balloon 210 as the substitute ingredients of the "black tiger shrimp".

The number of the substitute ingredients to be displayed is arbitrarily determined by an administrator. The display method of the substitute ingredients is not limited to the method using a balloon. For example, the display method may be any method by which the correspondence relationship between the substitute ingredients and the ingredient to be substituted for can be recognized. When there is a plurality of ingredient names having the related terms, the recipe server 1 may display the names of the substitute ingredients for each of the ingredient names or may display the names of the substitute ingredients for a part of the ingredient names.

3-3-4. Proposal of Category Classification

When there is an ingredient that frequently appears in recipes as a main ingredient in a certain category, maybe the recipes that include the ingredient as the main ingredient should be classified into another category. Thereby, for example, a category of an ingredient that is frequently used as a main ingredient is prepared, so that the user can easily find a desired category or it is possible to reduce the processing load of the recipe server 1 when retrieving recipes by using a category as a search condition. Therefore, when there is an ingredient that frequently appears in recipes as a main ingredient, the recipe server 1 causes the management terminal 2 to propose the administrator to classify the recipes including the ingredient as the main ingredient into a category different from the current category.

Specifically, for each ingredient name, the recipe server 1 calculates a ratio of pieces of recipe information that include the ingredient name as the first ingredient in a certain category to all pieces of recipe information in the category. The ratio is referred to as an FI2 value. When the FI2 value of a certain ingredient name exceeds a predetermined threshold value, the recipe server 1 extracts the ingredient name as a candidate. FI2(i, c) of the ingredient name i in the small category c is calculated by the formula 9 below.

$$FI2(i, c) = \frac{oc1(i, c)}{rn(c)} \qquad \text{[Mathematical Formula 9]}$$

In the formula 9, rn(c) is a total number of recipes classified into the small category c.

Next, the recipe server 1 studies semantic relations between the ingredient name extracted as a candidate and a category name of the target category. In the method using the FI value, it is not possible to identify semantic relations more detailed than semantic relations that the ingredient name relates to the category. Therefore, the recipe server 1 uses, for example, an encyclopedia site in order to study the semantic relations. There is a high probability that when an administrator creates a category for an ingredient that is frequently used, the name of the ingredient is registered in the encyclopedia site. The recipe server 1 controls proposal of category classification based on a search result of semantic relations. If the category name includes characters of "other", the recipe server 1 studies the semantic relations by using the name from which "other" is removed.

When the meaning of the ingredient name is the same as that of the category name, the recipe server 1 does not propose the category classification. This is because it is appropriate to classify a recipe where the category name is the name of the main ingredient into the current category. When the ingredient name is the same as the category name, their meanings are the same. When the ingredient name and the category name are synonym, the recipe server 1 may determine that their meanings are the same.

When the ingredient name is a hyponym of the category name, the recipe server 1 causes the management terminal 2 to propose creating a new category of which category name is the ingredient name. The reason of this is because, in this case, a certain ingredient among ingredients of a type indicated by the category is frequently used as a main ingredient.

FIG. 9A is an example of extracted related terms. FIG. 9B is a diagram illustrating a proposal example of creating a new category. As illustrated in FIG. 9A, an ingredient name "black tiger shrimp" is associated with a category "shrimp". The "black tiger shrimp" is a hyponym of the "shrimp". Therefore, when the FI2 value of the "black tiger shrimp" exceeds a threshold value, a proposal of creating a new category of which category name is "black tiger shrimp" is presented. For example, a message such as "Category recommended to be newly created: black tiger shrimp" is displayed on a screen of the management terminal 2.

The administrator may create a new category according to the presentation or need not create a new category. In the present embodiment, the small category is the lowest level category. Therefore, when creating a new category, the administrator creates a new category as a category belonging to the intermediate category to which the target category belongs. For example, the "black tiger shrimp" of a small category is created under the "seafood/seaweed" of an intermediate category. At this time, the administrator may change the category name "shrimp" to "other shrimps". When there is no limitation of the hierarchy of the category, the administrator may create a new category as a category belonging to the target category. For example, the "black tiger shrimp" is created under the "shrimp".

When a new category is created, for example, the administrator may prompt a user who posted a relevant recipe to change the category. The administrator may use, for example, an email as a means to prompt the user. Or, the administrator may move a corresponding recipe to a newly created category.

When the meaning of an ingredient name is not the same as that of the category name and the ingredient name is not a hyponym of the category name, the recipe server 1 causes the management terminal 2 to propose classifying recipe information including the ingredient name at the first place to a correct category. The reason of this is because there is a probability that the recipe information including the ingredient name at the first place is currently classified into a wrong category. A case in which when a user posts a recipe, the user selects a wrong category occurs not a few times. FIG. 9C is a proposal example to classify recipe information to a correct category. As illustrated in FIG. 9A, an ingredient name "crab" is associated with a category "shrimp". Essentially, the "crab" is not a related term of the "shrimp". Therefore, when the FI2 value of the "crab" exceeds a threshold value, classifying the "crab" into a correct category is presented. For example, a message such as "Recipe that is probably classified into a wrong category: Recipe of which first ingredient name is crab" is displayed on the screen of the management terminal 2.

The administrator may prompt a user who posted a corresponding recipe to change the category. Or, for example, the administrator may find out a correct category and move a corresponding recipe to the correct category. On the other hand, the recipe server 1 may cause the management terminal 2 to present candidates of the correct category. For example, the recipe server 1 searches for categories including the ingredient name. Then, the recipe server 1 causes the management terminal 2 to display the category names of the found categories. When there is no correct category, the administrator may create a new category.

The recipe server 1 may use, for example, a site other than the encyclopedia site, data base, and the like in order to searches for semantic relations. At least one of a hypernym and a hyponym should be acquired.

The recipe server 1 may simply determine only whether or not the meaning of the ingredient name is the same as that of the category name. When there is an ingredient that frequently appears in recipes as a main ingredient, the recipe server 1 may cause the management terminal 2 to present a message to propose classifying the recipes including the ingredient as the main ingredient into a category different from the current category. In this case, the recipe server 1 may determine only whether or not the meaning of the ingredient name is the same as that of the category name. Therefore, the recipe server 1 need not study the semantic relations at an encyclopedia site or the like. The recipe server 1 may determine only whether or not the ingredient name is a hyponym of the category name and does not need to determine whether or not the meaning of the ingredient name is the same as that of the category name. This is because when the ingredient name is a hyponym of the category name, the meaning of the ingredient name is not the same as that of the category name. When the ingredient name is not a hyponym of the category name, the recipe server 1 may cause the management terminal 2 to present a message to propose creating a new category.

The ingredient name that will be a candidate of the proposal of category classification is not limited to an ingredient name whose FI2 value exceeds a predetermined threshold value. For example, the recipe server 1 may determine an ingredient name of which FI2 value is the highest in a certain category to be a candidate of the proposal. Further, for example, the recipe server 1 may rank ingredient names in a certain category in descending order of the FI2 value and determine ingredient names higher than or equal to a predetermined rank to be candidates of the proposal. Further, for example, the recipe server 1 may determine ingredient names higher than or equal to a rank of the FI2 value within a predetermined ratio from the top to be candidates of the proposal.

4. Configuration of Recipe Server

Next, a configuration of the recipe server 1 will be described with reference to FIGS. 10 and 11.

Figure 10:
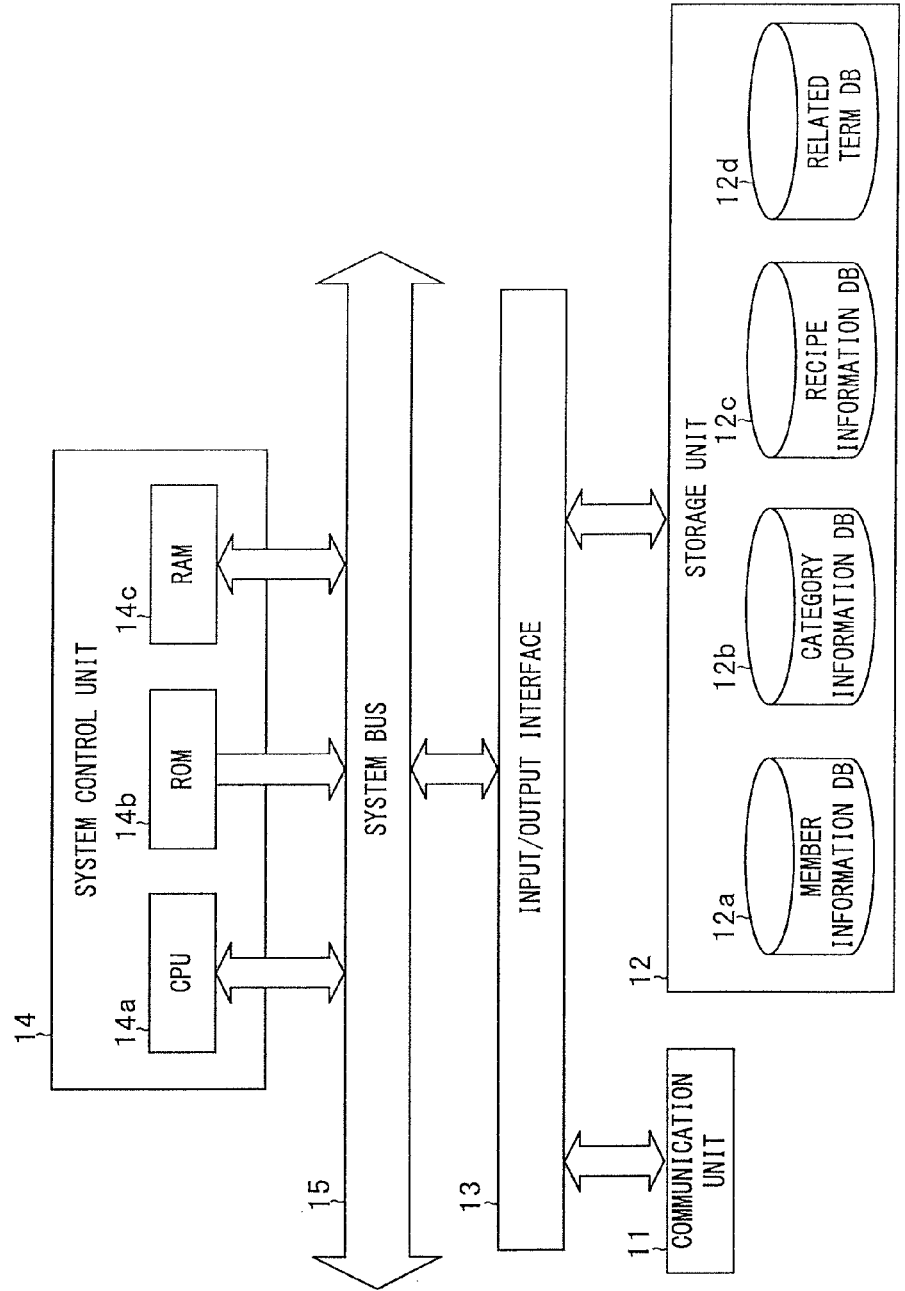
FIG. 10 is a block diagram illustrating an example of a schematic configuration of a recipe server 1 according to an embodiment.

FIG. 10 is a block diagram illustrating an example of a schematic configuration of the recipe server 1 according to the present embodiment. As illustrated in FIG. 10, the recipe server 1 includes a communication unit 11, a storage unit 12, an input/output interface 13, and a system control unit 14. The system control unit 14 and the input/output interface 13 are connected through a system bus 15.

The communication unit 11 connects to the networks NW and the like and controls communication states with the other servers, the management terminal 2, the user terminals 3, and the like.

The storage unit 12 includes, for example, a hard disk drive and the like. The storage unit 12 is an example of a storage means of the present invention. In the storage unit 12, databases are constructed, which are a member information DB 12a, a category information DB 12b, a recipe information DB 12c, and a related term DB 12d, and the like. The "DB" is an abbreviation of database.

FIG. 11A is a diagram illustrating an example of content registered in the member information DB 12a. In the member information DB 12a, member information related to users registered in the recipe site as members is registered. Specifically, in the member information DB 12a, attributes of a user are registered in association with each other for each user. The attributes of the user a user ID, a password, a nickname, a name, a birth date, a gender, a postal code, an address, a phone number, an email address, and the like.

FIG. 11B is a diagram illustrating an example of content registered in the category information DB 12b. In the category information DB 12b, category information related to categories of recipes is registered. Specifically, in the category information DB 12b, attributes of a category are registered in association with each other for each category. The attributes of the category are a category ID, a category name, a level of the category, a parent category ID, a child category ID list, and the like. For example, the category information is set by an administrator of the recipe site.

The categories are hierarchically defined by a tree structure. Specifically, each node in the tree structure corresponds to a category. A category corresponding to a child node of a certain category is referred to as a "child category". A category corresponding to a parent node of a certain category is referred to as a "parent category". For example, the "seafood/seaweed" is a child category of the "accompanying dish/side dish" and the "accompanying dish/side dish" is a parent category of the "seafood/seaweed".

The category ID is identification information of the category defined by the category information. The parent category ID is a category ID of the parent category of the category defined by the category information. The level indicates the depth of the category. The level of a large category is 1, the level of an intermediate category is 2, and the level of a small category is 3. The child category ID list is a list of category IDs of child categories of the category defined by the category information. The child category ID list is set when the category defined by the category information has a child category.

FIG. 11C is a diagram illustrating an example of content registered in the recipe information DB 12c. In the recipe information DB 12c, recipe information is registered. The recipe information is information registered by a user who posts the recipe. Specifically, in the recipe information DB 12c, attributes of a recipe are registered in association with each other for each recipe. The attributes of the recipe are a recipe ID, a published date and time, a user ID, a category ID, a recipe title, a dish name, a dish image, ingredient information, a comment, procedure information, and the like. The published date and time is a date and time at which the recipe is published. The user ID indicates a user who posted the recipe. The category ID indicates a small category to which the recipe is classified. The recipe information is an example of a recipe of the present invention.

FIG. 11D is a diagram illustrating an example of content included in the ingredient information. The ingredient information includes the number of target people. Further, the ingredient information includes a list of ingredients. Specifically, the ingredient information includes an ingredient name and the amount of the ingredient in association with each other for each ingredient. The arrangement order of the ingredients in the ingredient information corresponds to the display order in the recipe information.

FIG. 11E is a diagram illustrating an example of content registered in the related term DB 12d. In the related term DB 12d, ingredient names extracted as related terms are registered. Specifically, in the related term DB 12d, a category ID and one or more ingredient names are registered in association with each other for each small category. The category ID indicates a small category where the related terms are extracted. The ingredient name is an ingredient name extracted as a related term of the name of the category indicated by the category ID. By the category ID, the category name registered in the category information DB 12b and the ingredient names registered in the related term DB 12d are associated with each other.

Next, other information stored in the storage unit 12 will be described. The storage unit 12 stores various data such as HTML (HyperText Markup Language) documents for displaying web pages, XML (Extensible Markup Language) documents, image data, text data, and electronic documents. There are HTML documents of recipe pages in the HTML documents stored in the storage unit 12. The system control unit 14 generates the HTML document of the recipe page, for example, when recipe information is registered in the recipe information DB 12c. The storage unit 12 also stores various setting values.

Further, the storage unit 12 stores various programs such as an operating system, a WWW (World Wide Web) server program, a DBMS (Database Management System), and a recipe management program. The recipe management program is a program for performing various processes related to the recipe site. The recipe management program is an example of an information processing program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

Figure 12:
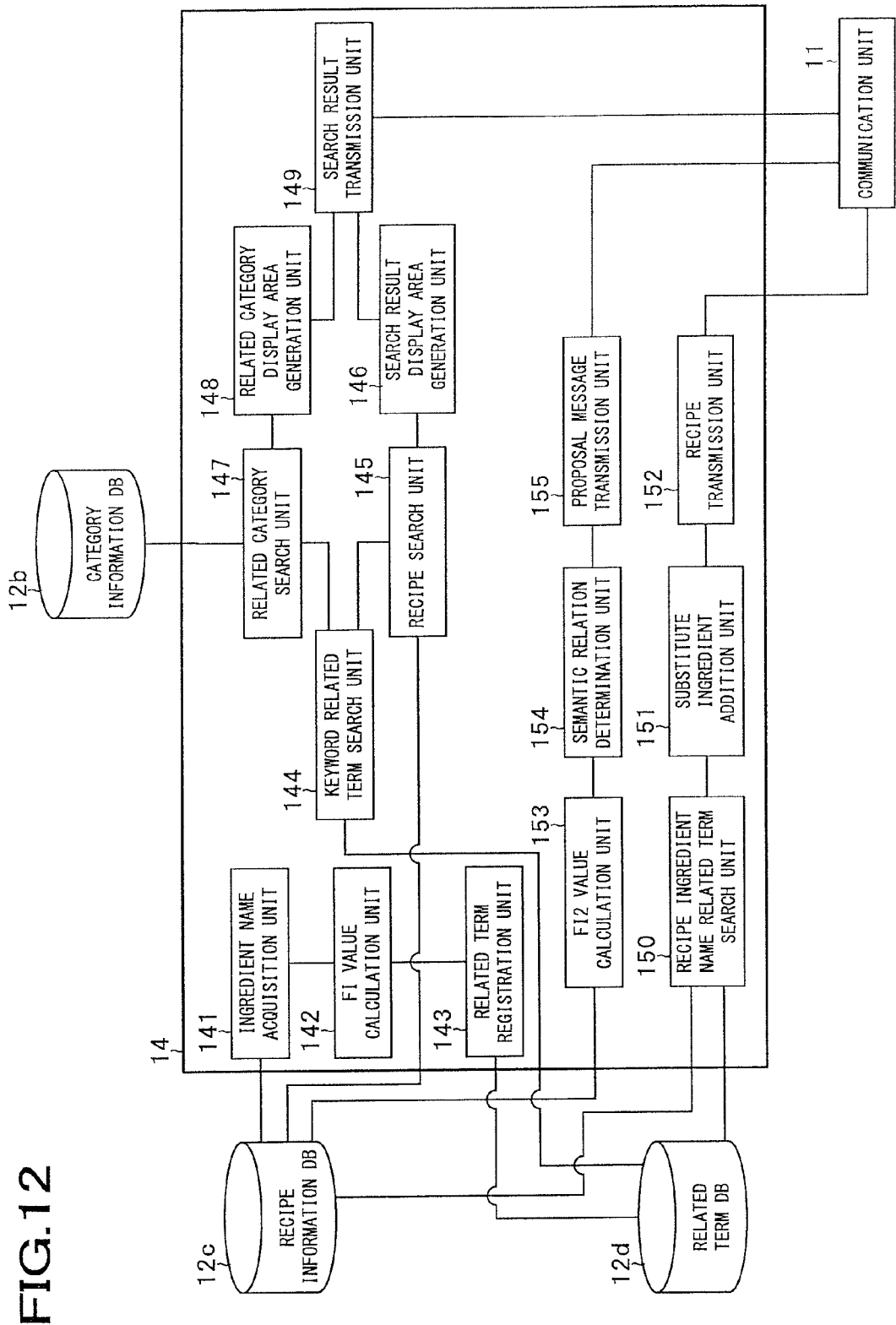
FIG. 12 is a diagram illustrating an example of functional blocks of a recipe server 1 according to an embodiment.

FIG. 12 is a block diagram illustrating an example of functional blocks of the recipe server 1 according to the present embodiment. The system control unit 14 includes a CPU (Central Processing Unit) 14a, a ROM (Read Only Memory) 14b, a RAM (Random Access Memory) 14c, and the like. As illustrated in FIG. 12, the CPU 14a reads and executes various programs, so that the system control unit 14 functions as an ingredient name acquisition unit 141, an FI value calculation unit 142, a related term registration unit 143, a keyword related term search unit 144, a recipe search unit 145, a search result display area generation unit 146, a related category search unit 147, a related category display area generation unit 148, a search result transmission unit 149, a recipe ingredient name related term search unit 150, a substitute ingredient addition unit 151, a recipe transmission unit 152, an FI2 value calculation unit 153, a semantic relation determination unit 154, and a proposal message transmission unit 155. The ingredient name acquisition unit 141 is an example of an ingredient name acquisition means of the present invention. The FI value calculation unit 142 is an example of a calculation means of the present invention. The related term registration unit 143 is an example of an association means of the present invention. The keyword related term search unit 144 is an example of a condition related term acquisition means of the present invention. The recipe search unit 145 is an example of a recipe search means of the present invention. A combination of the search result display area generation unit 146 and the search result transmission unit 149 is an example of a result presentation control means of the present invention. The related category search unit 147 is a division search means of the present invention. A combination of the related category display area generation unit 148 and the search result transmission unit 149 is an example of a division presentation control means of the present invention. The recipe ingredient name related term search unit 150 is an example of an ingredient name related term acquisition means of the present invention. A combination of the substitute ingredient addition unit 151 and the recipe transmission unit 152 is an example of an ingredient name presentation control means of the present invention. The FI2 value calculation unit 153 is an example of a ratio determination means of the present invention. The semantic relation determination unit 154 is an example of a relation determination means of the present invention. The proposal message transmission unit 155 is an example of a proposal information presentation control means of the present invention.

The ingredient name acquisition unit 141 acquires ingredient names from each piece of recipe information of a target category, which recipe information is registered in the recipe information DB 12c, in order to extract related terms. The FI value calculation unit 142 calculates the FI value of each ingredient name acquired by the ingredient name acquisition unit 141. The related term registration unit 143 associates a plurality of ingredient names whose FI value exceeds a threshold value with each other as related terms of the target category and registers the ingredient names in the related term DB 12d.

The keyword related term search unit 144 acquires related terms of a keyword specified as a search condition of recipes by a user from the related term DB 12d. The recipe search unit 145 searches for recipes by using a keyword specified as a search condition of recipes. Further, the recipe search unit 145 searches for recipe information by using a related term of the keyword. The search result display area generation unit 146 generates data to display the main search result display area 310 and the sub-search result display area 320 in the search result page based on the found recipe information. Then, the search result display area generation unit 146 adds the generated data to an HTML document of the search result page. The related category search unit 147 searches for related categories of a keyword specified as a search condition of recipes. Further, the related category search unit 147 searches for related categories of a related term of the keyword. The related category display area generation unit 148 generates data to display the related category display area 330 in the recipe page. Then, the related category display area generation unit 148 adds the generated data to an HTML document of the search result page. The search result transmission unit 149 transmits the HTML document to which the data are added by the search result display area generation unit 146 and the related category display area generation unit 148 to the user terminal 3 through the communication unit 11.

The recipe ingredient name related term search unit 150 acquires related terms of an ingredient name of a recipe whose recipe page is requested by a user from the related term DB 12d. The substitute ingredient addition unit 151 adds data to display the balloon 210 including related terms of an ingredient name as names of substitute ingredients to the HTML document of the recipe page. The recipe transmission unit 152 transmits the HTML document of the recipe page to which the data to display the balloon 210 is added to the user terminal 3 through the communication unit 11.

The FI2 value calculation unit 153 acquires ingredient names from each piece of recipe information of the target category, which recipe information is registered in the recipe information DB 12c. Further, the FI2 value calculation unit 153 calculates the FI2 value of each ingredient name. The semantic relation determination unit 154 determines semantic relations between an ingredient name whose FI2 value exceeds a threshold value and a category name of the target category by using an encyclopedia site. When the meaning of the ingredient name is not the same as that of the category name as a result of the determination of the semantic relations, the proposal message transmission unit 155 transmits a message to propose classifying recipe information in which the display ordinal number of the ingredient is the first into a category different from the target category to the user terminal 3 through the communication unit 11.

The recipe server 1 may include a plurality of server devices. For example, a server device that registers and searches for recipe information, a server device that extracts and associates related ingredient names, a server device that transmits a web page of the recipe site according to a request from the user terminal 3, a server device that manages databases, and the like may be connected to each other by a LAN or the like.

5. Operation of Information Processing System

Next, an operation of the information processing system S will be described with reference to FIGS. 13 to 16.

FIG. 13 is a flowchart illustrating a process example of a related term extraction process of the system control unit 14 of the recipe server 1 according to the present embodiment. For example, the related term extraction process is periodically performed. For example, the related term extraction process is performed for each ingredient category. A category from which related terms are extracted in the related term extraction process is referred to as a "target category". The target category is an example of one division in the present invention.

As illustrated in FIG. 13, the ingredient name acquisition unit 141 searches for recipe information including the category ID of the target category from the recipe information DB 12c (step S11). Next, the ingredient name acquisition unit 141 selects one of one or more pieces of the recipe information that was found (step S12). Next, the ingredient name acquisition unit 141 acquires one ingredient name from ingredient information of the selected recipe information (step S13). Here, if the ingredient name acquisition unit 141 has not acquired the same ingredient name as that of the ingredient name acquired this time since the related term extraction process was started, the ingredient name acquisition unit 141 sets the number of recipes that include the acquired ingredient name and the number of recipes that include the acquired ingredient name as the first ingredient name to 0.

Next, the FI value calculation unit 142 adds 1 to the number of recipes that include the acquired ingredient name (step S14). Next, the FI value calculation unit 142 determines whether or not the acquired ingredient name is the first ingredient name in the selected recipe (step S15). At this time, if the FI value calculation unit 142 determines that the acquired ingredient name is the first ingredient name in the recipe (YES in step S15), the FI value calculation unit 142 proceeds to step S16. On the other hand, if the FI value calculation unit 142 determines that the acquired ingredient name is not the first ingredient name in the recipe (NO in step S15), the FI value calculation unit 142 proceeds to step S17. In step S16, the FI value calculation unit 142 adds 1 to the number of recipes that include the acquired ingredient name as the first ingredient name.

Next, the ingredient name acquisition unit 141 determines whether or not there is an ingredient name that has not been acquired from the ingredient information of the selected recipe information (step S17). At this time, if the ingredient name acquisition unit 141 determines that there is an ingredient name that has not been acquired (YES in step S17), the ingredient name acquisition unit 141 proceeds to step S18. On the other hand, if the ingredient name acquisition unit 141 determines that all the ingredient names have been acquired (NO in step S17), the ingredient name acquisition unit 141 proceeds to step S19. In step S18, the ingredient name acquisition unit 141 acquires one ingredient name that has not been acquired from the ingredient information of the selected recipe information. Next, the ingredient name acquisition unit 141 proceeds to step S14.

In step S19, the ingredient name acquisition unit 141 determines whether or not there is a piece of the recipe information that has not been selected among the pieces of the recipe information that was found. At this time, if the ingredient name acquisition unit 141 determines that there is a piece of the recipe information that has not been selected (YES in step S19), the ingredient name acquisition unit 141 proceeds to step S20. On the other hand, if the ingredient name acquisition unit 141 determines that all the pieces of the recipe information have been selected (NO in step S19), the ingredient name acquisition unit 141 proceeds to step S21. In step S20, the ingredient name acquisition unit 141 selects a piece of the recipe information that has not been selected among the pieces of the recipe information that was found. Next, the ingredient name acquisition unit 141 proceeds to step S13.

In step S21, the FI value calculation unit 142 calculates the FI value for each ingredient name based on count results of the number of recipes that include the ingredient name and the number of recipes that include the ingredient name as the first ingredient name. Next, the related term registration unit 143 associates ingredient names whose FI value exceeds the threshold value with each other as related terms and stores the ingredient names (step S22). Specifically, the related term registration unit 143 associates the category ID of the target category with the ingredient names whose FI value exceeds the threshold value and registers the category ID and the ingredient names in the related term DB 12*d*. The related term registration unit 143 may register the category name corresponding to the category ID in the related term DB 12*d* in addition to the category ID or instead of the category ID. After completing this process, the related term registration unit 143 ends the related term extraction process.

The FI value calculation unit 142 may count the number of recipes that include the ingredient name and the number of recipes that include the ingredient name as the first ingredient name for only recipes that are published after the execution date and time of the previous related term extraction process and store these count results in the storage unit 12. Then, the FI value calculation unit 142 may update the numbers of the recipes by summing up the past count results and the current count results.

FIG. 14A is a flowchart illustrating a process example of a recipe search process of the system control unit 14 of the recipe server 1 according to the present embodiment. A user who tries to search for recipes inputs a keyword as a search condition. Then, the user terminal 3 transmits a search request to the recipe server 1. The search request includes the input keyword. The recipe search process is started when the recipe server 1 receives the search request.

As illustrated in FIG. 14A, the recipe search unit 145 performs a keyword search process (step S31). FIG. 14B is a flowchart illustrating a process example of the keyword search process of the system control unit 14 of the recipe server 1 according to the present embodiment. As illustrated in FIG. 14B, the recipe search unit 145 searches the recipe information DB 12*c* for recipe information in which an ingredient name or the like includes the keyword included in the search request (step S41). Next, the recipe search unit 145 determines whether or not the number of pieces of the recipe information that was found is smaller than a predetermined number (step S42). At this time, if the recipe search unit 145 determines that the number of pieces of the recipe information that was found is smaller than the predetermined number (YES in step S42), the recipe search unit 145 proceeds to step S43. On the other hand, if the recipe search unit 145 determines that the number of pieces of the recipe information that was found is greater than or equal to the predetermined number (NO in step S42), the recipe search unit 145 proceeds to step S45.

In step S43, the keyword related term search unit 144 searches the related term DB 12*d* for one or more related terms of the keyword included in the search request. Specifically, the keyword related term search unit 144 searches the related term DB 12*d* for an ingredient name that is the same as the keyword. Then, the keyword related term search unit 144 acquires ingredient names, as related terms, associated with the ingredient name that is the same as the keyword. Further, the keyword related term search unit 144 may acquire category IDs associated with the ingredient name that is the same as the keyword from the related term DB 12*d* and acquire category names corresponding to the category IDs from the category information DB 12*b* as related terms. Next, the recipe search unit 145 searches the recipe information DB 12*c* for recipe information in which an ingredient name or the like includes a found related term (step S44).

Next, the search result display area generation unit 146 sets data to display a list of the found recipe information (step S45). Specifically, when there are one or more pieces of recipe information in which the specified keyword is included in an ingredient name or the like, the search result display area generation unit 146 generates data to display the main search result display area 310. When there are one or more pieces of recipe information in which a related term is included in an ingredient name or the like, the search result display area generation unit 146 generates data to display the sub-search result display area 320. At this time, the search result display area generation unit 146 adds the recipe titles, the ingredient names, links to the recipe pages of the found recipe information, and the like into the data. Then, the search result display area generation unit 146 adds the generated data into the HTML document of the search result page. After completing this process, the search result display area generation unit 146 ends the keyword search process.

After the keyword search process is ended, as illustrated in FIG. 14A, the related category search unit 147 performs a related category search process (step S32). FIG. 14C is a flowchart illustrating a process example of the related category search process of the system control unit 14 of the recipe server 1 according to the present embodiment. As illustrated in FIG. 14C, the related category search unit 147 searches the category information DB 12*b* for category information in which the category name includes the keyword included in the search request (step S51). Next, the related category search unit 147 determines whether or not the number of pieces of the category information that was found is smaller than a predetermined number (step S52). At this time, if the related category search unit 147 determines that the number of pieces of the category information that was found is smaller than the predetermined number (YES in step S52), the related category search unit 147 proceeds to step S53. On the other hand, if the related category search unit 147 determines that the number of pieces of the category information that was found is greater than or equal to the predetermined number (NO in step S52), the related category search unit 147 proceeds to step S55.

In step S53, in the same manner as in step S43, the keyword related term search unit 144 searches the category information DB 12*b* for related terms of the keyword included in the search request from the related term DB 12*d*. Next, the related category search unit 147 searches category information in which the category name includes a found related term (step S54).

Next, the related category display area generation unit 148 adds data to display the related category display area 330 into the HTML document of the search result page based on the found category information (step S55). Specifically, on the basis of the found category information, the related category display area generation unit 148 generates data including category names and links for searching for recipes by using the categories, as search conditions, indicated by the found category information. Then, the related category display area generation unit 148 adds the generated data into the HTML document of the search result page. After completing this process, the related category display area generation unit 148 ends the related category search process.

After the keyword search process is ended, as illustrated in FIG. 14A, the search result transmission unit 149 transmits the HTML document of the search result page to the user terminal 3 that is the transmission source of the search request (step S33). After completing this process, the search result transmission unit 149 ends the recipe search process.

The user terminal 3, which receives the HTML document from the recipe server 1, displays the search result page on a screen as illustrated in, for example, FIG. 7, based on the HTML document. In this way, the system control unit 14 performs control to cause the user terminal 3 to present the search result of recipes as well as performs control to cause the user terminal 3 to present the related categories.

Figure 15:
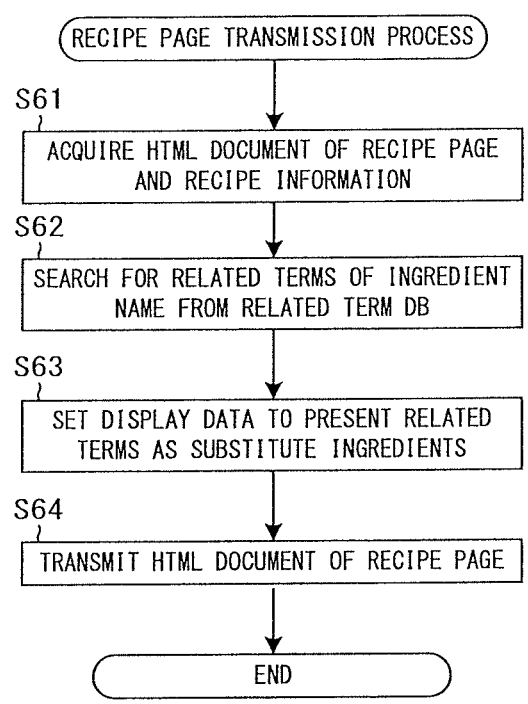
FIG. 15 is a flowchart illustrating a process example of a recipe page transmission process of the system control unit 14 of the recipe server 1 according to an embodiment.

FIG. 15 is a flowchart illustrating a process example of a recipe page transmission process of the system control unit 14 of the recipe server 1 according to the present embodiment. For example, when the search result page is displayed on the screen of the user terminal 3, the user selects one of the recipes in the main search result display area 310 and the sub-search result display area 320. Then, the user terminal 3 transmits a recipe page request to the recipe server 1. The recipe page request includes a URL (Uniform Resource Locator) of the recipe page of the selected recipe. The URL of the recipe page includes a recipe ID. The recipe page transmission process is started when the recipe server 1 receives the recipe page request.

As illustrated in FIG. 15, the recipe transmission unit 152 acquires an HTML document corresponding to the URL included in the recipe page request from the storage unit 12. Next, the recipe ingredient name related term search unit 150 acquires recipe information including the recipe ID included in the URL from the recipe information DB 12c (step S61). Next, the recipe ingredient name related term search unit 150 searches related term DB 12d for related terms of each ingredient name included in the ingredient information of the acquired recipe information (step S62). Specifically, the recipe ingredient name related term search unit 150 searches the related term DB 12d for ingredient names that are same as the ingredient names acquired from the ingredient information. Then, the recipe ingredient name related term search unit 150 acquires ingredient names, as related terms, associated with the same ingredient names.

Next, the substitute ingredient addition unit 151 adds data to display the balloon 210 in the recipe page into the acquired HTML document based on the found related terms (step S63). Next, the recipe transmission unit 152 transmits the acquired HTML document to the user terminal 3 that is the transmission source of the recipe page request (step S64). After completing this process, the recipe transmission unit 152 ends the recipe page transmission process.

The user terminal 3, which receives the HTML document from the recipe server 1, displays the recipe page on the screen as illustrated in, for example, FIG. 8, based on the HTML document. In this way, the system control unit 14 performs control so as to cause the user terminal 3 to present the related terms of the ingredient names included in the recipe information of the recipe requested from the user.

FIG. 16 is a flowchart illustrating a process example of a categorization proposal process of the system control unit 14 of the recipe server 1 according to the present embodiment. For example, the categorization proposal process may be periodically performed or may be performed based on a request from an administrator. For example, the categorization proposal process may be performed for each ingredient category or may be performed on an ingredient category specified from the administrator. A category to be processed in the categorization proposal process is referred to as a "target category".

As illustrated in FIG. 16, the semantic relation determination unit 154 searches the encyclopedia site for synonyms and hyponyms of the category name of the target category (step S71). Specifically, the semantic relation determination unit 154 transmits the category name of the target category to the encyclopedia server 4. The encyclopedia server 4 transmits an HTML document of a web page of description related to matters represented by the received category name to the recipe server 1. Then, semantic relation determination unit 154 analyzes the received HTML document and acquires synonyms and hyponyms of the category name. The semantic relation determination unit 154 may analyze the encyclopedia site and create a dictionary data base that defines semantic relations between terms in the storage unit 12 in advance. Then, the semantic relation determination unit 154 may acquire the synonyms and hyponyms from the dictionary data base.

Next, the FI2 value calculation unit 153 searches the recipe information DB 12c for recipe information including the category ID of the target category (step S72). Next, the FI2 value calculation unit 153 acquires ingredient names registered as related terms of the category name of the target category from the related term DB 12d (step S73). Specifically, the FI2 value calculation unit 153 acquires ingredient names associated with the category name of the target category. Next, the FI2 value calculation unit 153 selects one of the acquired ingredient names (step S74).

Next, the FI2 value calculation unit 153 calculates the FI2 value (step S75). Specifically, the FI2 value calculation unit 153 searches for pieces of recipe information that include the selected ingredient name as the first ingredient name from among all the pieces of recipe information in the target category. Next, the FI2 value calculation unit 153 calculates the number of pieces of recipe information that include the selected ingredient name as the first ingredient name. Then, the FI2 value calculation unit 153 calculates the FI2 value by dividing the number of pieces of recipe information that include the selected ingredient name as the first ingredient name by a total number of pieces of recipe information in the target category.

Next, the FI2 value calculation unit 153 determines whether or not the FI2 value is greater than a predetermined value (step S76). At this time, if the FI2 value calculation unit 153 determines that the FI2 value is greater than the predetermined value (YES in step S76), the FI2 value calculation unit 153 proceeds to step S77. On the other hand, if the FI2 value calculation unit 153 determines that the FI2 value is smaller than or equal to the predetermined value (NO in step S76), the FI2 value calculation unit 153 proceeds to step S81.

In step S77, the semantic relation determination unit 154 determines whether or not the meaning of the selected ingredient name is the same as that of the category name of the target category. At this time, if the semantic relation determination unit 154 determines that the meaning of the ingredient name is the same as that of the category name of the target category (YES in step S77), the semantic relation determination unit 154 proceeds to step S81. On the other hand, if the semantic relation determination unit 154 determines that the meaning of the ingredient name is not the same as that of the category name of the target category (NO in step S77), the semantic relation determination unit 154 proceeds to step S78.

In step S78, the semantic relation determination unit 154 determines whether or not the selected ingredient name is a hyponym of the category name of the target category. At this time, if the semantic relation determination unit 154 determines that the ingredient name is a hyponym of the category name (YES in step S78), the semantic relation determination unit 154 proceeds to step S79. On the other hand, if the semantic relation determination unit 154 determines that the ingredient name is not a hyponym of the category name (NO in step S78), the semantic relation determination unit 154 proceeds to step S80.

In step S79, the semantic relation determination unit 154 adds the selected ingredient name to a new category creation proposal target list. In step S80, the semantic relation determination unit 154 adds the selected ingredient name to another category classification proposal target list. After completing the process of step S79 or S80, the semantic relation determination unit 154 proceeds to step S81.

In step S81, the FI2 value calculation unit 153 determines whether or not there is an ingredient name that has not yet been selected among the ingredient names acquired from the related term DB 12d. At this time, if the FI2 value calculation unit 153 determines that there is an ingredient name that has not yet been selected (YES in step S81), the FI2 value calculation unit 153 proceeds to step S82. On the other hand, if the FI2 value calculation unit 153 determines that all the ingredient names have been selected (NO in step S81), the FI2 value calculation unit 153 proceeds to step S83. In step S82, the FI2 value calculation unit 153 selects one of the ingredient names that have not yet been selected. Next, the FI2 value calculation unit 153 proceeds to step S75.

In step S83, the proposal message transmission unit 155 outputs a processing result to the management terminal 2 based on the new category creation proposal target list and the another category classification proposal target list. Specifically, the proposal message transmission unit 155 generates a message including the ingredient names registered in the new category creation proposal target list as a message to propose creating a new category. Further, the proposal message transmission unit 155 generates a message including the ingredient names registered in another category classification proposal target list as a message to propose changing the category of the recipe from a wrong category to a correct category. These messages are an example of proposal information in the present invention. The proposal message transmission unit 155 transmits the generated messages to the management terminal 2. After completing this process, the proposal message transmission unit 155 ends the categorization proposal process.

For example, the management terminal 2 displays the messages received from the recipe server 1 as illustrated in FIG. 9B or 9C. In this way, the system control unit 14 performs control so as to cause the management terminal 2 to present information to propose classifying a recipe including an ingredient name, which frequently appears in recipes as the first ingredient name, as the first ingredient name into a category different from the target category.

As described above, according to the present embodiment, the system control unit 14 acquires one or more ingredient names of one or more pieces of recipe information included in the target category and aggregates ingredient names based on the display ordinal number of the acquired ingredient name in the ingredient list in each piece of recipe information. Specifically, the system control unit 14 calculates a value indicating a probability that an ingredient name is the name of the main ingredient of a recipe belonging to the target category for each ingredient name. The system control unit 14 associates a plurality of ingredient names where the value calculated as a aggregation result satisfies a predetermined condition among the acquired ingredient names with each other as related terms and stores the ingredient names in the storage unit 12. Therefore, it is possible to extract related ingredient names from the ingredient names included in the recipe information while reducing the time and effort of the administrator and the user.

The system control unit 14 associates the ingredient names that satisfy the condition with the category name of the target category as related terms. Therefore, it is possible to extract the ingredient names related to the category name.

The system control unit 14 calculates the FI value that is a ratio of the number of pieces of recipe information in which the display ordinal number of an ingredient name is the first to the number of pieces of recipe information including the ingredient name, and associates the ingredient names of which calculated FI values exceed a threshold value with each other. Therefore, it is possible to more accurately determine related ingredient names. Further, it is possible to extract an ingredient name which is not frequently used in a recipe as a related term.

The system control unit 14 acquires ingredient names which are stored in the storage unit 12 in association with a keyword specified by the user as a search condition, searches for categories in which the category name includes an acquired ingredient name, and causes the found categories to be presented. Therefore, it is possible to present categories highly related to matters represented by the specified keyword.

The system control unit 14 searches for categories in which the category name includes the specified keyword, and when the number of the found categories is smaller than a predetermined number, the system control unit 14 searches for categories in which the category name includes an ingredient name stored in the storage unit 12 in association with the keyword. Therefore, it is possible to reduce a load in search processing while securing the number of the presented categories.

The system control unit 14 acquires ingredient names which are stored in the storage unit 12 in association with a keyword specified by the user as a search condition, searches for recipe information by using the acquired ingredient names, and causes a search result of the recipe information to be presented. Therefore, it is possible to present recipe information which is probably desired by the user.

The system control unit 14 searches for recipe information by using a specified keyword, and when the number of the pieces of the recipe information that was found is smaller than a predetermined number, the system control unit 14 searches for recipe information by using ingredient names stored in the storage unit 12 in association with the keyword. Therefore, it is possible to reduce a load in search processing while securing the number of pieces of recipe information to be presented.

The system control unit 14 determines whether or not the FI2 value, which is a ratio of the number of pieces of recipe information in which the display ordinal number of an ingredient name stored in the storage unit 12 in association with the target category is the first to the number of pieces of recipe information included in the target category, exceeds a predetermine value for each ingredient name and determines semantic relations between an ingredient name of which FI2 value is determined to exceed the predetermined value and the category name of the target category, and when the meaning of the ingredient name of which FI2 value is determined to exceed the predetermined value is not the same as that of the category name of the target category, the system control unit 14 causes a message that proposes classifying the recipe information in which the display ordinal number of the ingredient name is the first into a category different from the target category to be presented. Therefore, the administrator can appropriately divide the category according to the message.

When it is determined that an ingredient name of which FI2 value is determined to exceed a predetermined value is a hyponym of the category name of the target category, the system control unit 14 causes a message that proposes creating a new category of which category name is the ingredient name to be presented. Therefore, if the administrator independently creates a category of an ingredient that is frequently used as a main ingredient according to the message, the user can easily find recipe information in which the ingredient is used as a main ingredient.

When it is determined that the meaning of an ingredient name of which FI2 value is determined to exceed a predetermined value is not the same as that of the category name of the target category and the ingredient name is not a hyponym of the category name of the target category, the system control unit 14 causes a message indicating that there is a probability that recipe information in which the display ordinal number of the ingredient name is the first is classified into a wrong category to be presented. Therefore, the administrator or the user can re-classify the recipe information into a correct category according to the proposal.

The system control unit 14 acquires ingredient names which are stored in the storage unit 12 in association with at least one ingredient name among one or more ingredient names included in the recipe information of the recipe page requested by the user and causes the acquired ingredient names to be presented. Therefore, it is possible to present substitute ingredients of an ingredient placed on the requested recipe page.

In the embodiment described above, the FI value is used as a value representing a probability that an ingredient name is the name of the main ingredient of a recipe belonging to one division. In the description below, an embodiment in which an average value of the display ordinal numbers of ingredient names is used will be described.

As described above, the smaller the display ordinal number of an ingredient name in recipe information, the more probable that the ingredient name is the name of the main ingredient of the recipe. Therefore, the recipe server 1 may calculate the average value of the display ordinal numbers of each ingredient name in each piece of recipe information classified into the target category. The smaller the calculated average value, the more probable that the ingredient is the main ingredient of the recipes in the target category. The recipe server 1 extracts ingredient names whose average value of the display ordinal numbers is smaller than or equal to a predetermined threshold value as related terms.

A specific example will be described below. FIG. 17 is a diagram illustrating an extraction example of related terms. As illustrated in FIG. 17, the recipes A to D are classified into a certain category X. In the recipe A, the ingredient names are displayed in the order of a, b, c, and d. In the recipe B, the ingredient names are displayed in the order of b, c, a, and f. In the recipe C, the ingredient names are displayed in the order of a, b, e, and c. In the recipe D, the ingredient names are displayed in the order of a, c, d, and e. The recipe server 1 calculates the average value of the display ordinal numbers by dividing the sum of the display ordinal numbers by the number of pieces of recipe information that include the ingredient name for each of the ingredients a to f. For example, the display ordinal numbers of the ingredient a are the first, third, first, and first, and the number of pieces of recipe information that include the ingredient name of the ingredient a is 4. Therefore, the average value of the display ordinal numbers of the ingredient a is 1.5. The display ordinal numbers of the ingredient b are the second, first, and second, and the number of pieces of recipe information that include the ingredient name of the ingredient b is 3. Therefore, the average value of the display ordinal numbers of the ingredient b is 1.67. In the same manner, the average value of the display ordinal numbers of the ingredient c is 2.75. If the threshold value is 2.0, the recipe server 1 extracts the ingredient names of the ingredients a and b as related terms. Then, the recipe server 1 associates the ingredient names of the ingredients a and b with the category name of the category X.

REFERENCE SIGNS LIST

1 Recipe server
2 Management terminal
3 User terminal
4 Encyclopedia server
11 Communication unit
12 Storage unit
12*a* Member information DB
12*b* Category information DB
12*c* Recipe information DB
12*d* Related term DB 12*d*
13 Input/output interface
14 System control unit
14*a* CPU
14*b* ROM
14*c* RAM
15 System bus
141 Ingredient name acquisition unit
142 FI value calculation unit
143 Related term registration unit
144 Keyword related term search unit
145 Recipe search unit
146 Search result display area generation unit
147 Related category search unit
148 Related category display area generation unit
149 Search result transmission unit
150 Recipe ingredient name related term search unit
151 Substitute ingredient addition unit
152 Recipe transmission unit
153 FI2 value calculation unit
154 Semantic relation determination unit
155 Proposal message transmission unit
NW Network
S Information processing system

The invention claimed is:

1. An information processing apparatus comprising:
at least one memory operable to store program code;
at least one processor operable to read said program code and operate as instructed by said program code, said program code including:
ingredient name acquisition code that causes the at least one processor to acquire one or more ingredient names included in each of recipes included in one division of a plurality of divisions of recipes, wherein each recipe includes an ingredient list including two or more ingredient names, and the each recipe is posted through an Internet network;
calculation code that causes the at least one processor to calculate, for each of the ingredient names, based on an ordinal number of each of the ingredient names acquired by the ingredient name acquisition code in the ingredient list in a recipe, a value indicating a probability that the ingredient name is a name of a main ingredient of the recipe belonging to the one division, the ordinal number indicating a position of the ingredient name among ingredient names in the ingredient list; and
association code that causes the at least one processor to associate, with each other as related terms, a plurality of the ingredient names, among the ingredient names acquired by the ingredient name acquisition code, whose values calculated by the calculation code exceed a threshold value, and to store the plurality of the ingredient names in a storage, wherein the value indicating the probability that the ingredient name is the name of the main ingredient of the recipe belonging to the one division is determined based on a ratio of a number of the recipes, in which the ordinal number of the ingredient name acquired by the ingredient name acquisition code indicates being the first in the ingredient list, to a number of total recipes including the ingredient name.

2. The information processing apparatus according to claim 1, wherein the association code causes the at least one processor to associate the ingredient names, whose values calculated by the calculation code exceed a threshold value with a name of the one division as related terms.

3. The information processing apparatus according to claim 2, further comprising:

condition related term acquisition code that causes the at least one processor to acquire the ingredient name stored in the storage in association with a term specified by a user as a search condition;

division search code that causes the at least one processor to search for the division whose division name includes the ingredient name acquired by the condition related term acquisition code; and division presentation control code that causes the at least one processor to cause the division found by the division search code to be presented.

4. The information processing apparatus according to claim 2, further comprising:

ratio determination code that causes the at least one processor to determine, for each ingredient name, whether the ratio exceeds a predetermined value;

relation determination code that causes the at least one processor to determine semantic relations between the ingredient name whose ratio is determined to exceed the predetermined value by the ratio determination code and a name of the one division; and proposal information presentation control code that causes the at least one processor to, when the meaning of the ingredient name is not the same as that of the name of the one division as a result of determination by the relation determination code, cause proposal information that proposes classifying the recipe, in which the ordinal number of the ingredient name indicates being the first in the ingredient list, into the division different from the one division to be presented.

5. The information processing apparatus according to claim 1, further comprising:

condition related term acquisition code that causes the at least one processor to acquire the ingredient name stored in the storage in association with a term specified by a user as a search condition;

division search code that causes the at least one processor to search for the division whose division name includes the ingredient name acquired by the condition related term acquisition code; and division presentation control code that causes the at least one processor to cause the division found by the division search code to be presented.

6. The information processing apparatus according to claim 4, wherein the division search code causes the at least one processor to search for the divisions whose division names include the specified term, and when a number of the divisions found is smaller than a predetermined number, the division search code causes the at least one processor to search for the division whose division name includes the ingredient name acquired by the condition related term acquisition code.

7. The information processing apparatus according to claim 6, further comprising:

recipe search code that causes the at least one processor to search for a recipe by using the ingredient name acquired by the condition related term acquisition code; and result presentation control code that causes the at least one processor to cause a search result by the recipe search code to be presented.

8. The information processing apparatus according to claim 5, further comprising:

recipe search code that causes the at least one processor to search for a recipe by using the ingredient name acquired by the condition related term acquisition code; and result presentation control code that causes the at least one processor to cause a search result by the recipe search code to be presented.

9. The information processing apparatus according to claim 8, wherein the recipe search code causes the at least one processor to search for recipes by using the specified term, and when a number of the recipes found is smaller than a predetermined number, the recipe search code causes the at least one processor to search for the recipe by using the ingredient name acquired by the condition related term acquisition code.

10. The information processing apparatus according to claim 5, further comprising:

ratio determination code that causes the at least one processor to determine, for each ingredient name, whether the ratio exceeds a predetermined value;

relation determination code that causes the at least one processor to determine semantic relations between the ingredient name whose ratio is determined to exceed the predetermined value by the ratio determination code and a name of the one division; and proposal information presentation control code that causes the at least one processor to, when the meaning of the ingredient name is not the same as that of the name of the one division as a result of determination by the relation determination code, cause proposal information that proposes classifying the recipe, in which the ordinal number of the ingredient name indicates being the first in the ingredient list, into the division different from the one division to be presented.

11. The information processing apparatus according to claim 1, further comprising:

ratio determination code that causes the at least one processor to determine, for each ingredient name, whether the ratio exceeds a predetermined value;

relation determination code that causes the at least one processor to determine semantic relations between the ingredient name whose ratio is determined to exceed the predetermined value by the ratio determination code and a name of the one division; and proposal information presentation control code that causes the at least one processor to, when the meaning of the ingredient name is not the same as that of the name of the one division as a result of determination by the relation determination code, cause proposal information that proposes classifying the recipe, in which the ordinal number of the ingredient name indicates being the first in the ingredient list, into the division different from the one division to be presented.

12. The information processing apparatus according to claim 11, wherein when it is determined that the ingredient name is a hyponym of the name of the one division, the proposal information presentation control code causes the at least one processor to cause the proposal information that proposes creating a new division whose division name is the ingredient name to be presented.

13. The information processing apparatus according to claim 12, wherein when it is determined that the meaning of the ingredient name is not the same as that of the name of the one division and the ingredient name is not a hyponym of the name of the one division, the proposal information presentation control code causes the at least one processor to cause the proposal information indicating that the recipe, in which the ordinal number of the ingredient name indicates being the first in the ingredient list, has a probability of being classified into a wrong division to be presented.

14. The information processing apparatus according to claim 11, wherein when it is determined that the meaning of the ingredient name is not the same as that of the name of the one division and the ingredient name is not a hyponym of the name of the one division, the proposal information presentation control code causes the at least one processor to cause the proposal information indicating that the recipe, in which the ordinal number of the ingredient name indicates being the first in the ingredient list, has a probability of being classified into a wrong division to be presented.

15. The information processing apparatus according to claim 1, further comprising:

ingredient name related term acquisition code that causes the at least one processor to acquire the ingredient name stored in the storage in association with at least one ingredient name among two or more ingredient names included in the recipe requested by a user; and ingredient name presentation control code that causes the at least one processor to cause the ingredient names acquired by the ingredient name related term acquisition code to be presented.

16. An information processing method performed by a computer, the method comprising:

an ingredient name acquisition step of acquiring ingredient names included in each of one or more recipes included in one division of a plurality of divisions of recipes, wherein each recipe includes an ingredient list including two or more ingredient names, and the each recipe is posted through an Internet network;

a calculation step of calculating, for each of the ingredient names, based on an ordinal number of each of the ingredient names acquired in the ingredient name acquisition step in the ingredient list in a recipe, a value indicating a probability that the ingredient name is a name of a main ingredient of the recipe belonging to the one division, the ordinal number indicating a position of the ingredient name among ingredient names in the ingredient list; and an association step of associating, with each other as related terms, a plurality of the ingredient names, among the ingredient names acquired in the ingredient name acquisition step, whose values calculated in the calculation step exceed a threshold value and storing the plurality of the ingredient names in a storage, wherein the value indicating the probability that the ingredient name is the name of the main ingredient of the recipe belonging to the one division is determined based on a ratio of a number of the recipes, in which the ordinal number of the ingredient name acquired by the ingredient name acquisition code indicates being the first in the ingredient list, to a number of total recipes including the ingredient name, wherein the ingredient name acquisition step, the calculation step, the association step, and the displaying step are performed by at least one processor.

* * * * *